US012528133B2

(12) United States Patent
Lomas et al.

(10) Patent No.: US 12,528,133 B2
(45) Date of Patent: Jan. 20, 2026

(54) METAL COUPON WITH BRAZE RESERVOIR FOR COMPONENT, COMPONENT WITH SAME AND RELATED METHOD

(71) Applicant: GE Infrastructure Technology LLC, Greenville, SC (US)

(72) Inventors: Jonathan Matthew Lomas, Simpsonville, SC (US); Jonathan Michael Hatch, Simpsonvile, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 131 days.

(21) Appl. No.: 18/417,625

(22) Filed: Jan. 19, 2024

(65) Prior Publication Data

US 2025/0235944 A1 Jul. 24, 2025

(51) Int. Cl.
*B22F 3/00* (2021.01)
*B23K 1/00* (2006.01)
*B23K 3/08* (2006.01)
*B33Y 80/00* (2015.01)
*B23K 101/00* (2006.01)

(52) U.S. Cl.
CPC .............. *B23K 3/08* (2013.01); *B23K 1/0018* (2013.01); *B33Y 80/00* (2014.12); *B23K 2101/001* (2018.08)

(58) Field of Classification Search
None
See application file for complete search history.

(56) References Cited

U.S. PATENT DOCUMENTS 653,280 A 7/1900 Barthels et al.
3,031,996 A 5/1962 Botvin
(Continued)

FOREIGN PATENT DOCUMENTS

CN 113430414 A 9/2021
DE 10 2018 218017 A1 4/2020
(Continued)

OTHER PUBLICATIONS

Non-Final Office Action dated May 9, 2025 for related U.S. Appl. No. 18/495,808, 16 pages.
(Continued)

*Primary Examiner* — Mary I Omori
(74) *Attorney, Agent, or Firm* — James Pemrick; Charlotte Wilson; Hoffman Warnick LLC

(57) ABSTRACT

A metal coupon for inserting in a component includes an additively manufactured (AM) metal member including a braze reservoir. The braze reservoir includes: a first cavity in the AM metal member; a second conduit fluidly coupling the first cavity to a surface of the AM metal member; a first conduit fluidly coupling the first cavity to a braze region; a blocking member blocking fluid communication through the first conduit between the first cavity and the braze region; a braze material in the first cavity; and a seal member seals the second conduit from an exterior of the AM metal member. A component may include a body including a braze reservoir similar to that described. The braze region may take a variety of forms such as a porous region, an interface between the coupon and the component, or a crack in the component body.

17 Claims, 19 Drawing Sheets

(56) References Cited

U.S. PATENT DOCUMENTS

| | | |
|---|---|---|
| 4,195,764 A | 4/1980 | Bogart |
| 5,156,321 A | 10/1992 | Liburdi et al. |
| 5,775,402 A | 7/1998 | Sachs et al. |
| 6,199,746 B1 | 3/2001 | Dupree et al. |
| 6,413,650 B1 | 7/2002 | Dupree et al. |
| 7,635,078 B2 | 12/2009 | Ariga et al. |
| 8,042,723 B2 | 10/2011 | Holi |
| 9,873,171 B2 | 1/2018 | Li et al. |
| 10,228,138 B2 | 3/2019 | Theuer et al. |
| 10,384,787 B2 | 8/2019 | Gordon et al. |
| 10,456,849 B2 | 10/2019 | Eminoglu et al. |
| 10,767,489 B2 | 9/2020 | Bunker |
| 10,975,719 B2 | 4/2021 | Ucok et al. |
| 11,001,002 B2 | 5/2021 | Kulinsky |
| 11,577,317 B2 | 2/2023 | Hart et al. |
| 11,712,738 B2 | 8/2023 | Ozbaysal et al. |
| 2007/0084047 A1 | 4/2007 | Lange et al. |
| 2009/0229101 A1 | 9/2009 | Ahmad et al. |
| 2010/0239412 A1 | 9/2010 | Draper |
| 2011/0099810 A1 | 5/2011 | Stankowski et al. |
| 2012/0003086 A1 | 1/2012 | Morris et al. |
| 2013/0086785 A1 | 4/2013 | Cui et al. |
| 2013/0104397 A1 | 5/2013 | Bunker |
| 2014/0020823 A1 | 1/2014 | Montross |
| 2014/0111956 A1 | 4/2014 | Taniguchi |
| 2014/0259666 A1 | 9/2014 | Baughman et al. |
| 2014/0321994 A1 | 10/2014 | Brzek et al. |
| 2015/0093566 A1 | 4/2015 | Bell |
| 2015/0147164 A1 | 5/2015 | Cui et al. |
| 2015/0283642 A1 | 10/2015 | Forsdike et al. |
| 2016/0059364 A1 | 3/2016 | Huxol |
| 2016/0090848 A1 | 3/2016 | Engeli et al. |
| 2016/0115571 A1 | 4/2016 | Kestler et al. |
| 2016/0214176 A1 | 7/2016 | Bruck et al. |
| 2016/0325368 A1 | 11/2016 | Landwehr et al. |
| 2017/0284206 A1 | 10/2017 | Roberts et al. |
| 2017/0328207 A1 | 11/2017 | Bunker |
| 2018/0010457 A1 | 1/2018 | Chabane et al. |
| 2018/0010458 A1 | 1/2018 | Chabane et al. |
| 2018/0023403 A1 | 1/2018 | Jones et al. |
| 2018/0161902 A1 | 6/2018 | Cui et al. |
| 2018/0180329 A9 | 6/2018 | Conrad et al. |
| 2018/0187564 A1 | 7/2018 | Cui et al. |
| 2018/0200817 A1 | 7/2018 | Henderson et al. |
| 2018/0320270 A1 | 11/2018 | Nardi et al. |
| 2018/0339354 A1 | 11/2018 | Eminoglu et al. |
| 2018/0345415 A1* | 12/2018 | Whims ............... B23K 1/206 |
| 2019/0054567 A1 | 2/2019 | Roerig et al. |
| 2019/0284942 A1 | 9/2019 | Tanigawa et al. |
| 2019/0329344 A1 | 10/2019 | Eminoglu et al. |
| 2019/0345826 A1 | 11/2019 | Packer et al. |
| 2020/0047253 A1 | 2/2020 | Thomas et al. |
| 2020/0072078 A1 | 3/2020 | Decesare et al. |
| 2020/0149403 A1 | 5/2020 | Kottilingam et al. |
| 2020/0254548 A1 | 8/2020 | Xu et al. |
| 2020/0384560 A1 | 12/2020 | Rebbecchi, Jr. et al. |
| 2021/0114110 A1 | 4/2021 | Sercombe et al. |
| 2021/0146459 A1 | 5/2021 | Gold et al. |
| 2021/0146485 A1 | 5/2021 | Bulgrin et al. |
| 2021/0154956 A1 | 5/2021 | Schubel et al. |
| 2022/0136395 A1 | 5/2022 | Ozbaysal et al. |
| 2022/0234101 A1 | 7/2022 | Ozbaysal et al. |
| 2022/0402031 A1 | 12/2022 | Hann et al. |
| 2025/0135588 A1* | 5/2025 | Salm ................ B33Y 10/00 |

FOREIGN PATENT DOCUMENTS

| | | |
|---|---|---|
| EP | 1074331 A1 | 2/2001 |
| EP | 2450471 A1 | 5/2012 |
| EP | 3360637 A1 | 8/2018 |
| EP | 3508686 A1 | 7/2019 |
| EP | 3693115 A1 | 8/2020 |
| TW | I670166 B | 9/2019 |
| WO | 2020014677 A1 | 1/2020 |
| WO | 2020145971 A1 | 7/2020 |
| WO | 2021247970 A1 | 12/2021 |

OTHER PUBLICATIONS

Non-Final Office Action issued in U.S. Appl. No. 18/495,803, dated Nov. 14, 2024, 26 pages.
EP Search Report for EP Application No. 24204162.2, dated Mar. 14, 2025, 11 pages.
Final Office Action for related U.S. Appl. No. 18/495,803, dated Mar. 19, 2025, 26 pages.
Non- Final Office Action dated Apr. 21, 2025 for related U.S. Appl. No. 18/495,816, 29 pages.
EP Search Report for EP Application No. 24204157.2, dated Mar. 14, 2025, 11 pages.
EP Search Report for EP Application No. 24204160.6, dated Apr. 16, 2025, 12 pages.
EP Search Report for EP Application No. 24204462.6, dated Apr. 1, 2025, 10 pages.
EP Search Report for EP Application No. 24204155.6, dated Apr. 2, 2025, 10 pages.
EP Search Report for EP Application No. 24204158.0, dated Mar. 19, 2025, 10 pages.
EP Search Report for EP Application No. 24204153.1, dated Mar. 3, 2025, 11 pages.
EP Search Report for EP Application No. 24204463.4, dated Apr. 22, 2025, 10 pages.
EP Search Report for EP Application No. 24204461.8, dated Mar. 14, 2025, 11 pages.
EP Search Report for EP Application No. 24204154.9, dated Mar. 19, 2025, 13 pages.
EP Search Report for EP Application No. 24204161.4, dated Mar. 14, 2025, 14 pages.
EP Search Report for EP Application No. 24204156.4, dated Mar. 18, 2025, 13 pages.
Office Action (Non-Final Rejection) dated Sep. 4, 2025 for U.S. Appl. No. 18/495,818 (pp. 1-13).
Office Action (Final Rejection) dated Aug. 8, 2025 for related U.S. Appl. No. 18/495,816, 15 pages.
Notice of Allowance and Fees Due dated Aug. 5, 2025 for related U.S. Appl. No. 18/495,817, 9 pages.
Office Action (Non-Final Rejection) dated Aug. 11, 2025 for related U.S. Appl. No. 18/495,809, 13 pages.
Office Action (Non-Final Rejection) dated Aug. 12, 2025 for related U.S. Appl. No. 18/495,810, 14 pages.
EP Search Report for EP Application No. 24223562.0, dated Jul. 8, 2025, 7 pages.
Office Action (Final Rejection) dated Sep. 26, 2025 for related U.S. Appl. No. 18/495,808, 17 pages.

* cited by examiner

METAL COUPON WITH BRAZE RESERVOIR FOR COMPONENT, COMPONENT WITH SAME AND RELATED METHOD

TECHNICAL FIELD

The disclosure relates generally to component repair, and more specifically, to component repair using a metal coupon with a braze reservoir or by using a braze reservoir in the component.

BACKGROUND

Industrial components occasionally require repair. For example, hot gas path components that are used in turbomachines to direct a working fluid to create energy may require repair. Hot gas path components can take a variety of forms, such as turbine rotor blades or stationary vanes, that include airfoils that direct a working fluid to create energy. Rotor blades are coupled to and act to turn a turbine rotor, and stationary vanes are coupled to a casing of the turbomachine to direct the working fluid towards the rotor blades.

Additive manufacturing such as direct metal laser melting (DMLM) or selective laser melting (SLM) has emerged as a reliable manufacturing method for making industrial components. The advent of additive manufacturing techniques has also provided the ability to replace sections of components such as part of a leading or trailing edge of a turbomachine blade. For example, a portion of a leading edge of a turbomachine blade may be removed, leaving a cutout in the blade, and a new section (referred to herein as a "coupon") may be coupled in the cutout. The coupon is additively manufactured to have a shape that at least generally matches that of the cutout. The coupon can replace a worn section of a used turbomachine blade or be added as part of a new turbomachine blade. The coupon can simply replace internal cooling structures of the turbomachine blade, or may advantageously provide additional or improved cooling structures, e.g., near wall cooling passages, that were not provided in the original turbomachine blade.

However, replacement coupons are made with the same materials and exterior structure as the removed portion of the component. Consequently, the replacement coupons suffer from some of the same drawbacks as the original component and/or cutout with no improvement to general performance characteristics such as overall strength, stress/strain resistance, ductility, wear resistance, thermal or electrical conductivity, and/or decreased mass. A single braze material is used to couple the replacement coupon to the component, which prevents improving the general performance characteristics listed above and additional performance characteristics related to the joint, such as increasing joint adhesive bond strength and reliability, and decreasing required post-braze machining/blending. Using coupons that are materially identical to the removed cutouts also does not allow reduction in the high material cost for the replacement coupons. In addition, current brazing processes only introduce braze material from an exterior of the metal coupon and/or the component, limiting the ability to direct braze material internally of the coupon and/or component, e.g., to repair internal damage, ensure braze infiltration and/or otherwise improve braze performance.

BRIEF DESCRIPTION

All aspects, examples and features mentioned below can be combined in any technically possible way.

An aspect of the disclosure provides a metal coupon for inserting in a component, the metal coupon comprising: an additively manufactured (AM) metal member including a braze reservoir, the braze reservoir including: a first cavity in the AM metal member; a first conduit fluidly coupling the first cavity to a braze region; and a blocking member blocking fluid communication through the first conduit between the first cavity and the braze region; a first braze material in the first cavity; and a seal member sealing the first cavity from an exterior of the AM metal member.

Another aspect of the disclosure includes any of the preceding aspects, and the blocking member includes a eutectic mixture of a metal material of the AM metal member and at least one element of the first braze material.

Another aspect of the disclosure includes any of the preceding aspects, and further comprising a second cavity defined in the AM metal member and by an enlarged area of the first conduit between the first cavity and the braze region, the second cavity having a second braze material therein that is different than the first braze material.

Another aspect of the disclosure includes any of the preceding aspects, and the second braze material has a higher melting temperature than the first braze material.

Another aspect of the disclosure includes any of the preceding aspects, and the braze region includes at least one of: a porous region within the AM metal member, a contact interface between the AM metal member and a coupon opening in a body of a component in which the AM metal member is located, and a portion of the body of the component in which the AM metal member is located.

Another aspect of the disclosure includes any of the preceding aspects, and the porous region has a variable porosity with two or more porous sub-regions having different porosities.

Another aspect of the disclosure includes any of the preceding aspects, and the braze reservoir is removable from the AM metal member, leaving a remaining section of the AM metal member.

Another aspect of the disclosure includes any of the preceding aspects, and further comprising a second conduit fluidly couples the first cavity to an exterior surface of the AM metal member, wherein the seal member seals the second conduit from the exterior surface of the AM metal member.

Another aspect of the disclosure includes an additively manufactured (AM) component, comprising: a body including a braze reservoir, the braze reservoir including: a first cavity defined in the body; a first braze material in the first cavity; a seal member sealing the second conduit from an exterior of the body; a first conduit defined in the body and fluidly coupling the first cavity to a braze region; and a blocking member extending across the first conduit to block fluid communication between the first cavity and the braze region prior to exposure of the blocking member to a predetermined temperature exceeding a melting temperature of the first braze material.

Another aspect of the disclosure includes any of the preceding aspects, and the blocking member includes a eutectic mixture of a metal material of the body and the first braze material, wherein the predetermined temperature exceeds a melting temperature of the first braze material.

Another aspect of the disclosure includes any of the preceding aspects, and in response to the body exceeding the predetermined temperature, the first braze material and the blocking member liquefy, causing the liquefied first braze material to flow through the first conduit to infiltrate the braze region.

Another aspect of the disclosure includes any of the preceding aspects, and further comprising a second cavity defined in the body and the first conduit between the first cavity and the braze region, the second cavity having a second braze material therein that is different than the first braze material, wherein the liquefied first braze material flows through the first conduit and liquefies the second braze material, wherein the liquefied first and second braze materials infiltrate the braze region.

Another aspect of the disclosure includes any of the preceding aspects, and the second braze material has a higher melting temperature than the first braze material.

Another aspect of the disclosure includes any of the preceding aspects, and in response to the body exceeding the predetermined temperature, the first cavity is at least partially open space.

Another aspect of the disclosure includes any of the preceding aspects, and the braze region includes at least one of: a contact interface between a coupon opening in the body and a metal coupon in the coupon opening, a porous region at least partially in at least one of the body and the metal coupon, and at least one of a portion and an exterior surface of the body.

Another aspect of the disclosure includes any of the preceding aspects, and the porous region has a variable porosity with two or more porous sub-regions having different porosities.

Another aspect of the disclosure includes any of the preceding aspects, and the braze reservoir is removable from the body, leaving a remaining section of the body and the braze region.

Another aspect of the disclosure includes any of the preceding aspects, and further comprising a second conduit fluidly coupling the first cavity to an exterior surface of the body, wherein the seal member seals the second conduit from the exterior surface of the body.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
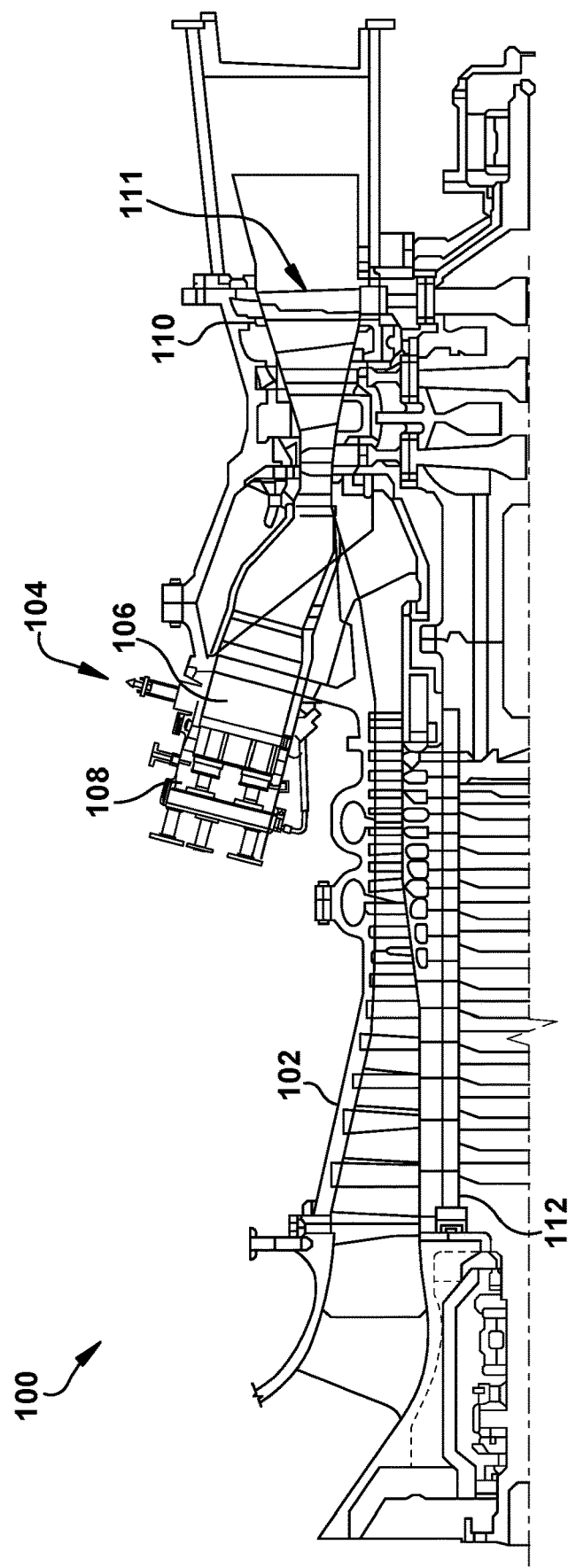
FIG. 1 shows a schematic view of an illustrative industrial machine in the form of a gas turbine system and including a component according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As indicated above, the disclosure provides a metal coupon for inserting in a component. A "coupon" as used herein may include any part positioned in a coupon opening in a body of the component as part of original manufacture of the component or to repair a part of the component, e.g., after a damaged part has been removed. The metal coupon includes an additively manufactured (AM) metal member including a braze reservoir. The braze reservoir includes: a first cavity in the AM metal member; a second conduit fluidly coupling the first cavity to an exterior surface of the AM metal member; a first conduit fluidly coupling the first cavity to a braze region; a blocking member blocking fluid communication through the first conduit between the first cavity and the braze region; a braze material in the first cavity; and a seal member sealing the second conduit from an exterior of the AM metal member. In another embodiment, a component may include a body including a braze reservoir similar to that just described. In any event, the braze reservoir is thermally triggered by the metal coupon and/or component body reaching a predetermined temperature greater than the melting temperature of the braze material, which, perhaps with pressure created by the predetermined temperature, opens the blocking member, e.g., melts, dissolves or ruptures the blocking member. The braze region that receives the liquefied braze material may take a variety of forms such as but not limited to: a porous region in the AM metal member of the metal coupon, an interface between the metal coupon and the body of the component, or a crack in the component body. Use of a porous region in the metal coupon allows customization of the braze process and resulting structure and can also reduce material costs. Where used for repair, the customized metal coupons do not suffer the same drawbacks as the original component and/or cutout and can be customized with the porous region(s) and/or braze material(s) to, for example, change: joint adhesive bond strength, stress/strain resistance, ductility, wear resistance, oxidation resistance, thermal conductivity, electrical conductivity, surface roughness, hardness and/or mass. One or more braze materials can be used to couple the replacement coupon to the component to also improve performance characteristics related to the joint, such as joint adhesive bond strength and reliability, and reducing required post-brazing machining/blending. The braze reservoir additionally provides liquefied braze material to difficult areas to reach, and the ability to provide motive force into a variety of braze regions, e.g., porous regions, cracks, and interfaces between coupon and component body. The pressurized liquefied braze material from the braze reservoir (pressurized from heat in the first cavity) may infiltrate a variety of braze regions that may not normally receive liquefied braze material entering through gravity forces and/or capillary action. When used in a body of a component, the braze reservoir may provide self-healing, e.g., for internal cracks, during use of the component or during heat treatment without additional processing.

FIG. 1 shows a schematic illustration of an illustrative industrial machine, which may include a component according to teachings of the disclosure. In the example, the machine includes a turbomachine 100 in the form of a combustion or gas turbine (GT) system. Turbomachine 100 includes a compressor 102 and a combustor 104. Combustor 104 includes a combustion region 106 and a fuel nozzle assembly 108. Turbomachine 100 also includes a turbine assembly 110 and a common compressor/turbine shaft or rotor 112. In one embodiment, turbomachine 100 is a 7HA.03 engine, commercially available from GE Vernova. The present disclosure is not limited to any one particular GT system and may be implemented in connection with other engines including, for example, the other HA, F, B, LM, GT, TM and E-class engine models of GE Vernova, and engine models of other companies. Furthermore, the present disclosure is not limited to any particular turbomachine, and may be applicable to, for example, steam turbines, jet engines, compressors, turbofans, etc. Moreover, the present disclosure is not limited to any particular turbomachine component and may be applicable to any industrial component that employs coupons during manufacture or repair.

In operation, air flows through compressor 102 and compressed air is supplied to combustor 104. Specifically, the compressed air is supplied to fuel nozzle assembly 108 that is integral to combustor 104. Assembly 108 is in flow communication with combustion region 106. Fuel nozzle assembly 108 is also in flow communication with a fuel source (not shown in FIG. 2) and channels fuel and air to combustion region 106. Combustor 104 ignites and combusts fuel. Combustor 104 is in flow communication with turbine assembly 110 for which gas stream thermal energy is converted to mechanical rotational energy. Turbine assembly 110 includes a turbine 111 that rotatably couples to and drives rotor 112. Compressor 102 also is rotatably coupled to rotor 112. In the illustrative embodiment, there are a plurality of combustors and fuel nozzle assemblies 108.

Figure 2:
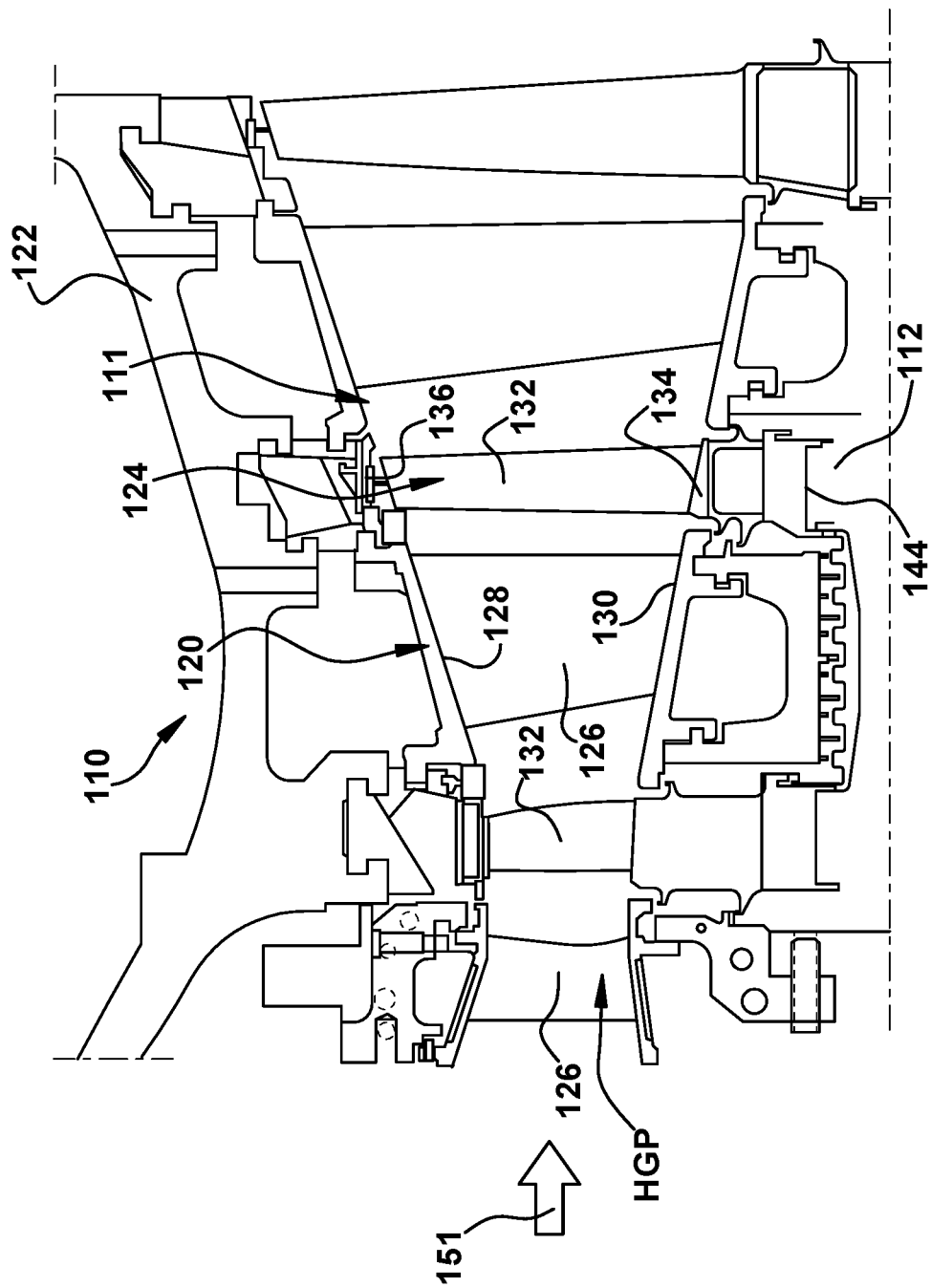
FIG. 2 shows a cross-sectional view of an illustrative gas turbine assembly that may be used with the gas turbine system in FIG. 1 and including a component according to embodiments of the disclosure.

FIG. 2 shows a cross-sectional view of an illustrative turbine assembly 110 of turbomachine 100 (FIG. 1) that may be used with the gas turbine system in FIG. 1. Turbine 111 of turbine assembly 110 includes a row of nozzle or vanes 120 coupled to a stationary casing 122 of turbomachine 100 and axially adjacent a row 124 of rotating blades 132. A stationary vane or nozzle 126 may be held in turbine assembly 110 by a radially outer platform 128 and a radially inner platform 130. Row 124 of blades in turbine assembly 110 includes rotating blades 132 coupled to rotor 112 and rotating with the rotor. Rotating blades 132 may include a radially inward platform 134 (at root of blade) coupled to rotor 112 and, optionally, a radially outward tip shroud 136 (at tip of blade). As used herein, the term "component" may refer collectively to stationary nozzles 126, rotating blades 132 or any other structure in which metal coupons including porous region(s) according to the disclosure can be employed.

Figure 3:
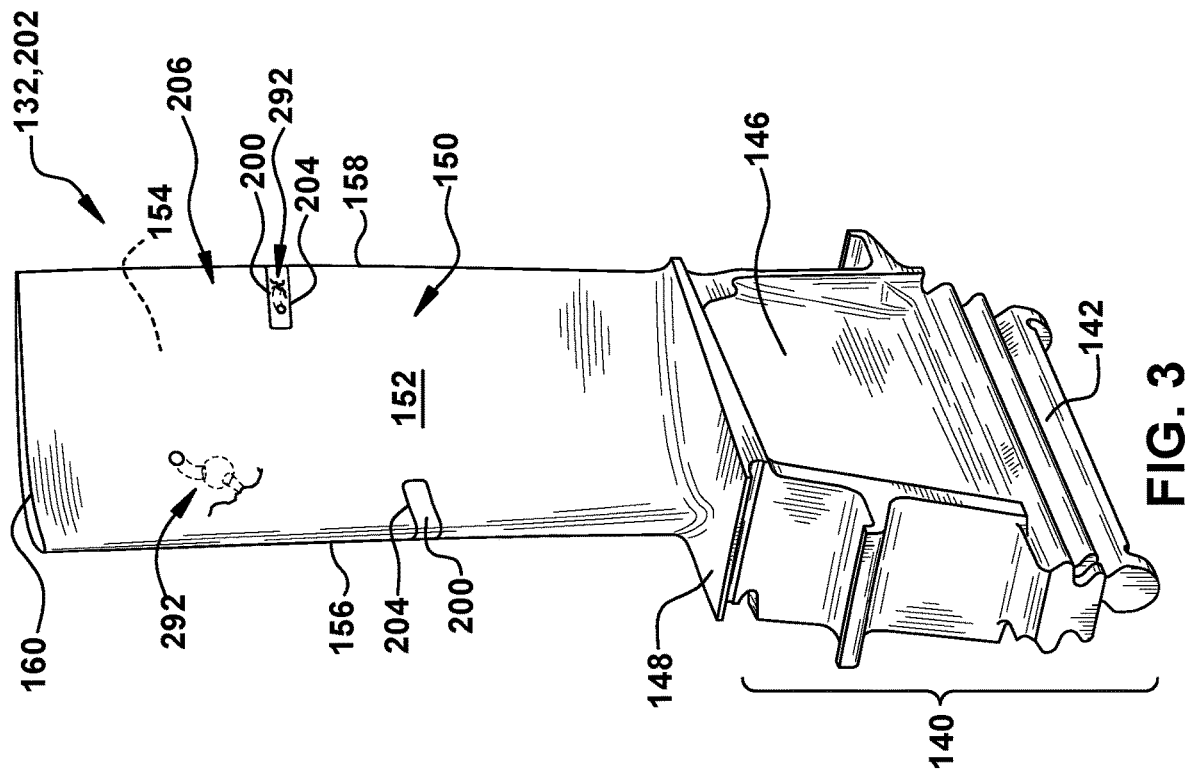
FIG. 3 shows a perspective view of a component in the form of a turbine rotating blade including a metal coupon according to embodiments of the disclosure.
Figure 4:
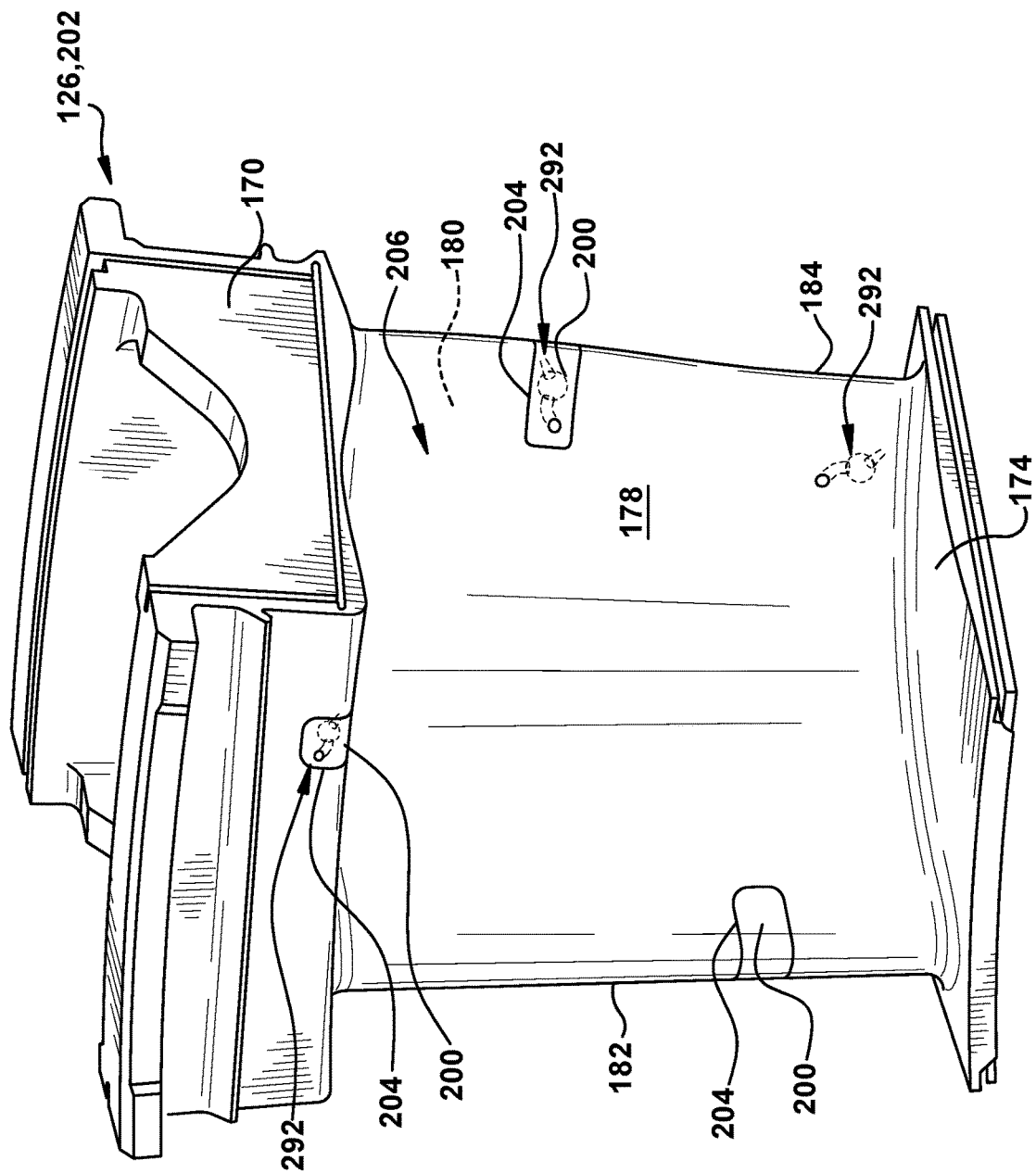
FIG. 4 shows a perspective view of a component in the form of a turbine nozzle including a metal coupon according to embodiments of the disclosure.

FIGS. 3 and 4 show illustrative components, such as hot gas path components of a turbomachine, in which teachings of the disclosure may be employed. FIG. 3 shows a perspective view of a turbine rotor blade 132 of the type in which embodiments of the present disclosure may be employed. Turbine rotor blade 132 includes a root 140 by which rotor blade 132 attaches to rotor 112 (FIG. 2). Root 140 may include a dovetail 142 configured for mounting in a corresponding dovetail slot in the perimeter of a rotor wheel 144 (FIG. 2) of rotor 112 (FIG. 2). Root 140 may further include a shank 146 that extends between dovetail 142 and a platform 148, which is disposed at the junction of an airfoil 150 and root 140 and defines a portion of the inboard boundary of the flow path through turbine assembly 110. It will be appreciated that airfoil 150 is the active component of rotor blade 132 that intercepts the flow of working fluid 151 (FIG. 2), i.e., hot combustions gases, and induces the rotor disc to rotate. It will be seen that airfoil 150 of rotor blade 132 includes a concave pressure side (PS) outer wall 152 and a circumferentially or laterally opposite convex suction side (SS) outer wall 154 extending axially between opposite leading and trailing edges 156, 158 respectively. Side outer walls 152 and 154 also extend in the radial direction from platform 148 to an outboard tip 160, the latter of which may or may not include a tip shroud 136 (FIG. 2).

FIG. 4 shows a perspective view of a stationary nozzle 126 of the type in which embodiments of the present disclosure may be employed. Stationary nozzle 126 includes an outer platform 170 by which stationary nozzle 126 attaches to stationary casing 122 (FIG. 2) of the turbomachine. Outer platform 170 may include any now known or later developed mounting configuration for mounting in a corresponding mount in the casing. Stationary nozzle 126 may further include an inner platform 174 for positioning between adjacent turbine rotor blades 132 (FIG. 3) platforms 148 (FIG. 3). Platform 170, 174 define respective portions of the outboard and inboard boundary of the flow path through turbine assembly 110. It will be appreciated that airfoil 176 is the active component of stationary nozzle 126 that intercepts the flow of working fluid and directs it towards turbine rotor blades 132 (FIG. 3). It will be seen that airfoil 176 of stationary nozzle 126 includes a concave pressure side (PS) outer wall 178 and a circumferentially or laterally opposite convex suction side (SS) outer wall 180 extending axially between opposite leading and trailing edges 182, 184 respectively. Side outer walls 178 and 180 also extend in the radial direction from platform 170 to platform 174.

It is understood that blade 132 or nozzle 126 may include internal cooling structures including sources of coolant such as passages, conduits and other structures that deliver coolant to a surface thereof for film cooling. Coolant may include, for example, air from compressor 102.

Embodiments of the disclosure described herein may include aspects applicable to either stationary nozzle 126, turbine rotor blade 132 and/or any other industrial component that employs coupons. FIGS. 3 and 4 also show illustrative additively manufactured (AM) metal coupons 200 (hereafter "metal coupons 200" or "AM metal coupons(s) 200" for brevity) in a component 202. More particularly, metal coupons 200 may be in a coupon opening 204 in a body 206 of component 202. A "coupon opening 204 in body 206" may be any size void in body 206 up to an including a removed section of body 206, e.g., tip shroud. For example, metal coupons 200 can be in openings 204 in trailing edges 158, 184 of blade 132 or nozzle 126, respectively. Alternatively, metal coupons 200 can be in openings 204 in leading edges 156, 182 of blade 132 or nozzle 126, respectively. Metal coupon 200 could also be in any tip (not shown) of blade 132 or platform 170 (shown in FIG. 4), 174 of nozzle 126. It is emphasized, however, that metal coupons 200 can be employed in any coupon opening 204 in a body 206 of component 202. Body 206 can be any part of, or all, of component 202.

Figure 5:
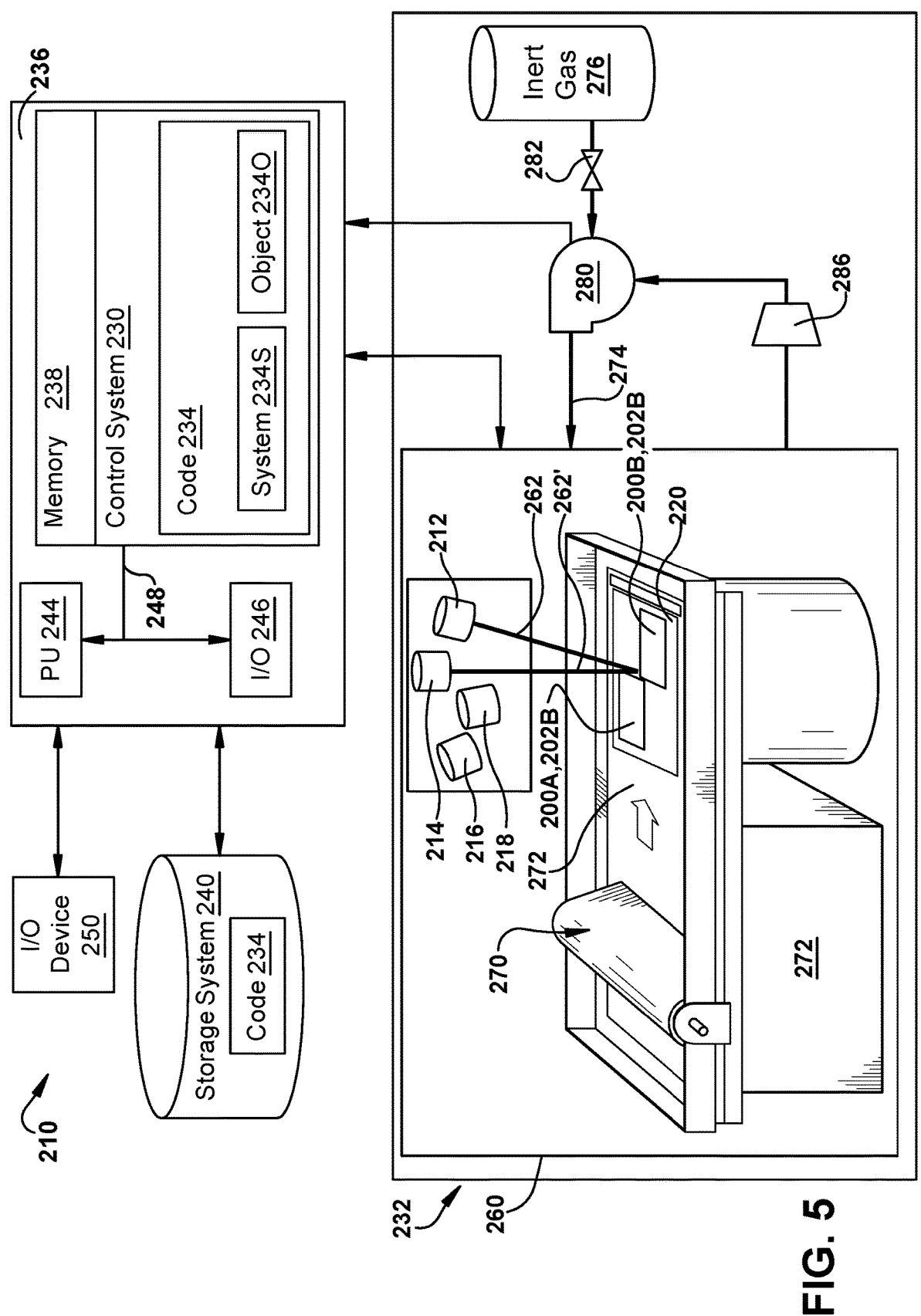
FIG. 5 shows a schematic block diagram of an illustrative additive manufacturing system for additively manufacturing a metal coupon according to embodiments of the disclosure.

Additively manufactured (AM) metal coupons 200 and/or additively manufactured (AM) components 202 that include a braze reservoir and/or one or more porous regions may be made using any now known or later developed technique capable of forming porous region(s). FIG. 5 shows a schematic/block view of an illustrative computerized metal powder additive manufacturing system 210 (hereinafter 'AM system 210') for generating metal coupon 200, components 202, multiple metal coupons 200A, 200B (shown) or multiple components 202, of which only a single layer is shown. The teachings of the disclosures will be described relative to building metal coupon 200 or component 202 using multiple melting beam sources 212, 214, 216, 218, but it is emphasized and will be readily recognized that the teachings of the disclosure are equally applicable to build multiple coupons 200A, 200B and/or components 202 using any number of melting beam sources. In this example, AM system 210 is arranged for direct metal laser melting (DMLM). It is understood that the general teachings of the disclosure are equally applicable to other forms of metal powder additive manufacturing such as but not limited to powder bed fusion, direct metal laser sintering (DMLS), electron beam melting (EBM), selective laser sintering (SLS), selective laser melting (SLM), and perhaps other forms of additive manufacturing (i.e., other than metal powder applications). Coupons 200A, 200B are illustrated as rectangular elements; however, it is understood that the additive manufacturing process can be readily adapted to manufacture any shaped coupon or component, a large variety of different coupons or components, and a large number of coupons or components on build platform 220.

AM system 210 generally includes an additive manufacturing control system 230 ("control system") and an AM printer 232. As will be described, control system 230 executes set of computer-executable instructions or code 234 to generate coupon(s) 200 or component(s) 202 using multiple melting beam sources 212, 214, 216, 218. In the example shown, four melting beam sources may include four lasers. However, the teachings of the disclosures are applicable to any melting beam source, e.g., an electron beam, laser, etc. Control system 230 is shown implemented on computer 236 as computer program code. To this extent, computer 236 is shown including a memory 238 and/or storage system 240, a processor unit (PU) 244, an input/output (I/O) interface 246, and a bus 248. Further, computer 236 is shown in communication with an external I/O device/resource 250. In general, processor unit (PU) 244 executes computer program code 234 that is stored in memory 238 and/or storage system 240. While executing computer program code 234, processor unit (PU) 244 can read and/or write data to/from memory 238, storage system 240, I/O device 250 and/or AM printer 232. Bus 248 provides a communication link between each of the components in computer 236, and I/O device 250 can comprise any device that enables a user to interact with computer 236 (e.g., keyboard, pointing device, display, etc.). Computer 236 is only representative of various possible combinations of hardware and software. For example, processor unit (PU) 244 may comprise a single processing unit or be distributed across one or more processing units in one or more locations, e.g., on a client and server. Similarly, memory 238 and/or storage system 240 may reside at one or more physical locations. Memory 238 and/or storage system 240 can comprise any combination of various types of non-transitory computer readable storage medium including magnetic media, optical media, random access memory (RAM), read only memory (ROM), etc. Computer 236 can comprise any type of computing device such as an industrial controller, a network server, a desktop computer, a laptop, a handheld device, etc.

As noted, AM system 210 and, in particular control system 230, executes code 234 to generate metal coupon(s) 200 or component(s) 202. Code 234 can include, among other things, a set of computer-executable instructions 234S (herein also referred to as 'code 234S') for operating AM printer 232, and a set of computer-executable instructions 234O (herein also referred to as 'code 234O') defining metal coupon(s) 200 or component(s) 202 to be physically generated by AM printer 232. As described herein, additive manufacturing processes begin with a non-transitory computer readable storage medium (e.g., memory 238, storage system 240, etc.) storing code 234. Set of computer-executable instructions 234S for operating AM printer 232 may include any now known or later developed software code capable of operating AM printer 232.

Set of computer-executable instructions 234O defining metal coupon(s) 200 or component(s) 202 may include a precisely defined 3D model of a coupon and can be generated from any of a large variety of well-known computer aided design (CAD) software systems such as AutoCAD®, TurboCAD®, DesignCAD 3D Max, etc. In this regard, code 234O can include any now known or later developed file format. Furthermore, code 234O representative of metal coupon(s) 200 or component(s) 202 may be translated between different formats. For example, code 234O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 234O representative of metal coupon(s) 200 or component(s) 202 may also be converted into a set of data signals and transmitted, received as a set of data signals and converted to code, stored, etc., as necessary. Code 234O may be configured according to embodiments of the disclosure to allow for formation of border and internal sections in overlapping field regions, as will be described. In any event, code 234O may be an input to AM system 210 and may come from a part designer, an intellectual property (IP) provider, a design company, the operator or owner of AM system 210, or from other sources. In any event, control system 230 executes code 234S and 234O, dividing metal coupon(s) 200 or component(s) 202 into a series of thin slices that assembles using AM printer 232 in successive layers of material.

AM printer 232 may include a processing chamber 260 that is sealed to provide a controlled atmosphere for metal coupon(s) 200 or component(s) 202 printing. A build platform 220, upon which metal coupon(s) 200 or component(s) 202 is/are built, is positioned within processing chamber 260. A number of melting beam sources 212, 214, 216, 218 are configured to melt layers of metal powder on build platform 220 to generate coupon(s) 200 or component(s) 202. While four melting beam sources 212, 214, 216, 218 are illustrated, it is emphasized that the teachings of the disclosure are applicable to a system employing any number of sources, e.g., 1, 2, 3, or 5 or more. As understood in the field, each melting beam source 212, 214, 216, 218 may have a field including a non-overlapping field region, respectively, in which it can exclusively melt metal powder, and may include at least one overlapping field region in which two or more sources can melt metal powder. In this regard, each melting beam source 212, 214, 216, 218 may generate a melting beam, respectively, that fuses particles for each slice, as defined by code 234O. For example, in FIG. 5, melting beam source 212 is shown creating a layer of metal coupon(s) 200 or component(s) 202 using melting beam 262 in one region, while melting beam source 216 is shown creating a layer of metal coupon(s) 200 or component(s) 202 using melting beam 262' in another region. Each melting beam source 212, 214, 216, 218 is calibrated in any now known or later developed manner. That is, each melting beam source 212, 214, 216, 218 has had its laser or electron beam's anticipated position relative to build platform 220 correlated with its actual position in order to provide an individual position correction (not shown) to ensure its individual accuracy. In one embodiment, each of plurality melting beam sources 212, 214, 216, 218 may create melting beams, e.g., 262, 262', having the same cross-sectional dimensions (e.g., shape and size in operation), power and scan speed.

Continuing with FIG. 5, an applicator (or re-coater blade) 270 may create a thin layer of raw material 272 spread out as the blank canvas from which each successive slice of the final coupon will be created. Various parts of AM printer 232 may move to accommodate the addition of each new layer, e.g., a build platform 220 may lower and/or chamber 260 and/or applicator 270 may rise after each layer. The process may use different raw materials in the form of fine-grain metal powder, a stock of which may be held in a chamber 260 accessible by applicator 270. In the instant case, coupon(s) 200 or component(s) 202 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.). Other possibilities include, for example, René 108, CM 247 LC, Mar M 247 and any precipitation harden-able (PH) nickel alloy.

Processing chamber 260 is filled with an inert gas such as argon or nitrogen and controlled to minimize or eliminate oxygen. Control system 230 is configured to control a flow of a gas mixture 274 within processing chamber 260 from a source of inert gas 276. In this case, control system 230 may control a pump 280, and/or a flow valve system 282 for inert gas to control the content of gas mixture 274. Flow valve system 282 may include one or more computer controllable valves, flow sensors, temperature sensors, pressure sensors, etc., capable of precisely controlling flow of the particular gas. Pump 280 may be provided with or without valve system 282. Where pump 280 is omitted, inert gas may simply enter a conduit or manifold prior to introduction to processing chamber 260. Source of inert gas 276 may take the form of any conventional source for the material contained therein, e.g., a tank, reservoir or other source. Any sensors (not shown) required to measure gas mixture 274 may be provided. Gas mixture 274 may be filtered using a filter 286 in a conventional manner.

In operation, build platform 220 with metal powder thereon is provided within processing chamber 260, and control system 230 controls flow of gas mixture 274 within processing chamber 260 from source of inert gas 276. Control system 230 also controls AM printer 232, and in particular, applicator 270 and melting beam sources 212, 214, 216, 218 to sequentially melt layers of metal powder on build platform 220 to generate metal coupon(s) 200 or component(s) 202 according to embodiments of the disclosure.

While a particular AM system 210 has been described herein, it is emphasized that the teachings of the disclosure are not limited to any particular additive manufacturing system or method. Also, while the teachings of the disclosure relate to an additively manufactured metal coupon(s) 200 or component(s) 202, it will be recognized that where component 202 does not include a braze reservoir or porous region(s), component 202 may be manufactured in any now known or later developed manner such as casting, or other methodology. Component 202 may include any of the material(s) listed herein for metal coupon(s) 200.

As noted, in certain embodiments of the disclosure, metal coupon 200 includes an additively manufactured (AM) metal member 290 including a braze reservoir 292 in an interior of AM metal member 290. In other embodiments of the disclosure, component 202 includes body 206 including a braze reservoir 292. As will be further described, braze reservoir 292 may supply liquefied braze material to a braze region 294, which may include, in one example, a porous region 300 in metal coupon 200 and/or body 206 of component 202.

"Porosity," as used herein, is a ratio of open space volume to total volume of the stated structure, e.g., porous regions, metal coupon, etc. Typically, in this regard, porosity is stated as a percentage of volume of open space to overall or total volume of the stated structure. The open space is empty areas in a solid material and may be referred to herein as "pores" 302 and may include interconnecting passages in the material of the stated structure. A "porous region" in metal coupon 200 is thus less than 100% solid and includes open spaces in the form of pores 302 and/or interconnecting passages. Porous metal coupons 200 may include solid regions, but also include one or more porous regions (as part of a braze region 294) that are less than 100% solid. As used herein, a three-dimensional boundary of a porous region or sub-region for purpose of identifying a "total volume" thereof can be identified by where a change in porosity of greater than 2% relative to an adjacent region or sub-region occurs within metal coupon 200 and/or an edge of metal coupon 200 exists. "Open space volume" is collectively a three-dimensional space that is empty, i.e., a void, gap, empty space and/or not filled with material, within a region or sub-region. As used herein, "different porosities" or "differences in porosity," generally means any variety of characteristics such as: percentage of open space volume to total volume, a number of pores 302 in a given volume, the volume (i.e., size) of pores 302, shape of pores 302, and variations in connecting openings between pores 302 that may not be recognized as actual discrete pores (referred to herein as "pore connecting passages"). Pore size can be in a range of, for example, 0.025 to 0.381 cubic millimeters (0.0001-0.015 cubic inches). With differences in, for example, pore shape or pore connecting passages, it will be recognized that differences in porosity may not be exclusively based on percentage of open space volume to total volume. However, where differences in porosities are compared in terms of degree, e.g., higher or lower, the difference referenced is exclusively that of the volume characteristics, i.e., percentage of open space volume to total volume. In the drawings, the different porous regions or sub-regions are typically shown as being continuous or in contact with one another, it is emphasized however that they can be isolated from one another in any manner, e.g., with solid areas therebetween. That is, a single metal coupon may include one or more isolated, non-contacting porous regions.

Porous metal coupon(s) 200 can be formed with different porous regions with different porosities (which may or may not include one or more porous sub-regions with different porosities) using AM system 210 as described herein, or any other metal additive manufacturing system or method capable of forming porous metals. In terms of AM system 210 operation, melting beam sources 212, 214, 216, 218 can be programmed to intermittently not sinter metal, leaving metal powder rather than solid material. This process may include overlapping laser field regions by different amounts and/or designing pores 302 into a build file, i.e., code 234O. Less overlap of each laser scan creates more porosity, and more lasers overlap between successive scans creates less porosity. Laser spot size, scanning speed, focus and power can also be controlled to adjust porosity. When the unmelted metal powder is removed from metal coupon(s) 200, it leaves pores 302 with interconnecting passages between pores 302 and creating one or more porous region(s) in metal coupon 200. In any event, the layered manufacture of metal coupon 200 can be controlled to create the desired porosity for any number, shape and/or size of porous regions within any desired layers of metal coupon(s) 200.

Figure 6A:
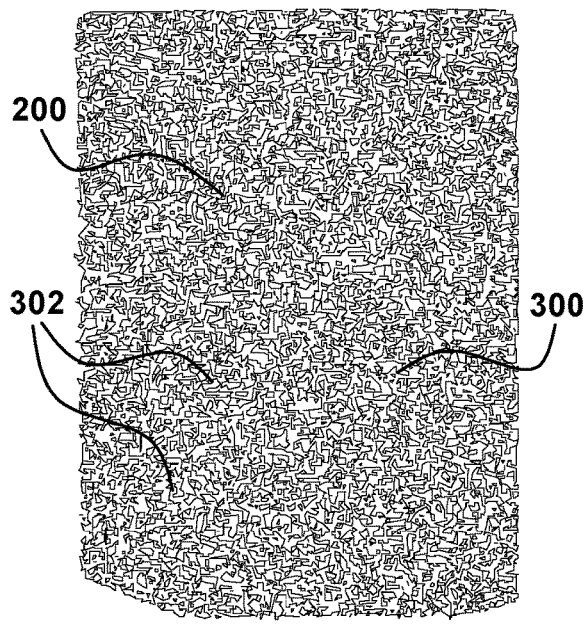
FIGS. 6A-D show top-down views of sample metal coupons having porous regions having different porosities according to embodiments of the disclosure.
Figure 6B:
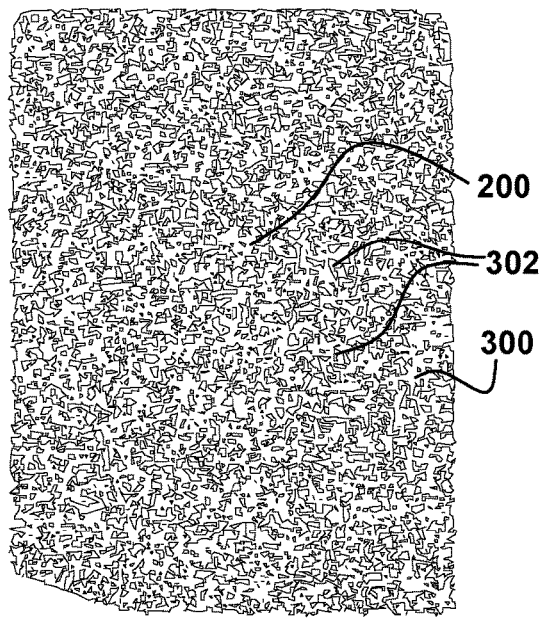
Figure 6C:
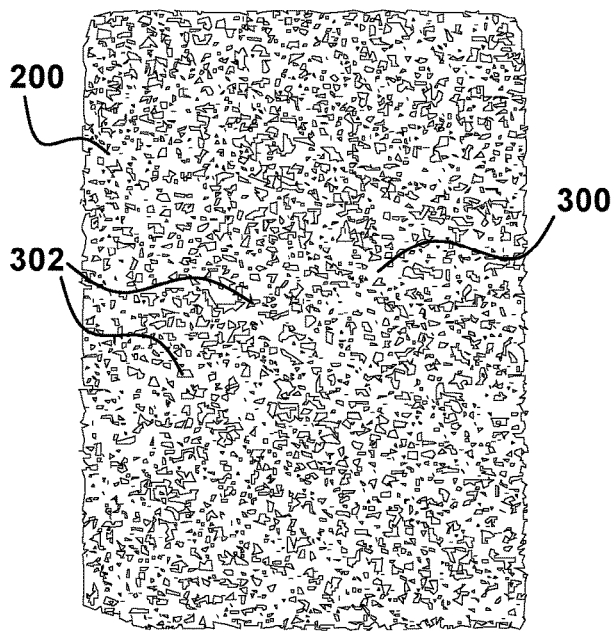
Figure 6D:
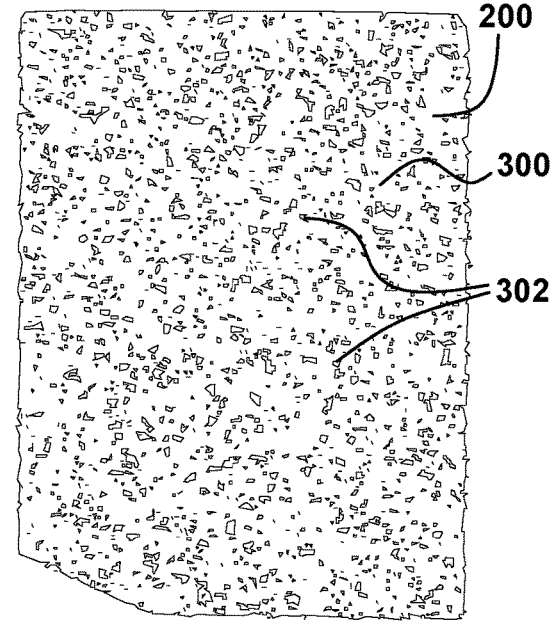

FIGS. 6A-D show top-down schematic views of sample metal coupons 200 having different porosities. Pores 302 are shown as darker open spaces in the drawings. FIG. 6A shows a sample metal coupon 200 having a first porosity of approximately 40% open space volume to total volume of the sample (with a generally low amount of open space and more or larger pores 302), FIG. 6B shows a sample metal coupon 200 having a first porosity of approximately 30% open space volume to total volume of sample, FIG. 6C shows a sample metal coupon 200 having a first porosity of approximately 20% open space volume to total volume of the sample, FIG. 6D shows a sample metal coupon 200 having a first porosity of approximately 10% open space volume to total volume of the sample (with a generally low amount of open space). Each porous region may have a porosity between 2% to 50% open space volume to total volume of the porous region, i.e., 2% to 50% open space with the other 50% to 98% solid. In other embodiments, each porosity may be between 10% to 40% open space volume to total volume of porous region 300, i.e., 10% to 40% open space with the other 60% to 90% solid. In other embodiments, porous region(s) can be provided in metal coupons 200 having a porosity in a range of less than 10%, in a range of less than 15%, in a range of less than 20%, in a range of less than 25%, in a range of less than 30%, in a range of less than 35%, in a range of less than 40%, in a range of less than 45%, in a range of 2% to 45%, in a range of 2% to 40%, in a range of 2% to 35%, in a range of 2% to 30%, in a range of 2% to 25%, in a range of 2% to 20%, in a range of 5% to 45%, in a range of 5% to 40%, in a range of 5% to 35%, in a range of 5% to 30%, in a range of 5% to 25%, in a range of 5% to 20%, in a range of 10% to 45%, in a range of 10% to 40%, in a range of 10% to 35%, in a range of 10% to 30%, in a range of 10% to 25%, in a range of 10% to 20%, in a range of 15% to 45%, in a range of 15% to 40%, in a range of 15% to 35%, in a range of 15% to 30%, in a range of 15% to 25%, in a range of 15% to 20%, in a range of 10% to 50%, in a range of 20% to 50%, in a range of 25% to 50%, in a range of 30% to 50%, in a range of 35% to 50%, or in a range of 40% to 50%. As will be described herein, other ranges of porosity are also possible.

FIGS. 7A-D show schematic cross-sectional views of an illustrative braze reservoir 292 in a metal coupon 200 or component 202, according to embodiments of the disclosure. Metal coupon 200 includes AM metal member 290 having braze reservoir 292 therein. Here, braze reservoir 292 is in an interior of AM metal member 290. Component 202 includes a body 206 with braze reservoir 292 therein. Here, braze reservoir 292 is in an interior of body 206.

With regard to metal coupon 200 first, as shown in FIGS. 7A-D, braze reservoir 292 includes a first cavity 320 in AM metal member 290, a second conduit 322 fluidly coupling first cavity 320 to an exterior surface 306 of AM metal member 290, and a first conduit 324 fluidly coupling first cavity 320 to braze region 294. As used herein, conduits 322, 324 are elongated passages or open spaces configured to direct un-melted, metal powder braze material or melted braze material therethrough. Further, cavities 320 are not elongated or less elongated open spaces configured to hold or store un-melted first braze material 328 (but allow melted braze material to exit through a conduit in fluid communication therewith). The cavities and conduits can be formed by programming melting beam sources 212, 214, 216, 218 of AM system 210 to not sinter metal in certain areas of a metal coupon 200 or component 202, leaving metal powder rather than solid material. Once metal coupon 200 or component 202 is complete, the un-melted metal powder can be removed, leaving the cavities and/or conduits. Braze reservoir 292 also includes a first braze material 328 in first cavity 320 and a seal member 330 sealing second conduit 322 from an exterior of AM metal member 290. First braze material 328 is introduced (inserted) into first cavity 320 through second conduit 322 after additive manufacture of metal coupon 200. As will be described further herein, first braze material 328 can be introduced to first cavity 320 in a controlled atmosphere, e.g., within a non-reactive gas such as but not limited to, argon and/or nitrogen. First braze material 328 can be in a powder form or a non-powder form such as a paste made of powder and a binder, e.g., Braz-Binder Gel available from Vitta. Braze material 328 (or any braze material described herein, e.g., 360) may include any now known or later developed brazing composition, such as but not limited to: GE (Alstom) B1P, Amdry™ D15, DF4B, or BRB, some the formulations of which are listed with other braze material formulations in the following table:

| Alloy | Ni | Cr | Co | B | Al | Ta | Y |
|---|---|---|---|---|---|---|---|
| Amdry ™ D15 | 65.10 | 15.30 | 10.30 | 2.30 | 3.50 | 3.50 | 0.00 |
| Amdry ™ BRB | 70.50 | 14.00 | 9.00 | 2.50 | 4.00 | 0.00 | 0.00 |
| Amdry ™ DF4B | 67.15 | 14.00 | 10.00 | 2.75 | 3.50 | 2.50 | 0.10 |

Once first braze material 328 is in first cavity 320, seal member 330 is formed to seal second conduit 322. Seal member 330 may include any structure capable of closing second conduit 322 at or near exterior surface 306 of AM metal member 290, i.e., after first braze material 328 has been introduced to first cavity 320 through second conduit 322. For example, seal member 330 may include a plug or weld in second conduit 322 at or near exterior surface 306 of AM metal member 290.

Braze reservoir 292 may also include a blocking member 332 blocking fluid communication through first conduit 324 between first cavity 320 and a braze region 294. Blocking member 332 blocks fluid communication through first conduit 324 between first cavity 320 and braze region 294 prior to exposure of blocking member 332 to a predetermined temperature exceeding a melting temperature of first braze material 328. Blocking member 332 may include any material having a melting temperature that is less than the material of AM metal member 290 and higher than or equal to the material of first braze material 328. In certain embodiments, blocking member 332 may include a eutectic mixture of a metal material of AM metal member 290 and at least one element of first braze material 328. In this case, blocking member 332 may be formed by additive manufacture with AM metal member 290, i.e., with the same material as AM metal member 290, and then absorption of element(s) of first braze material 328 (once first braze material 328 is introduced into first cavity 320) changes its melting temperature compared to the rest of AM metal member 290.

In one example, AM metal member 290 (coupon 200) and blocking member 332 may include a superalloy such as In-738, In-738LC, MAR-M-247, Rene-108, GTD-111, or variants designed for additive manufacturing, or any other superalloy common to turbomachine components, and first braze material 328 may include any of the braze materials listed herein. Blocking member 332 is a relatively thin layer of material compared to the rest of AM metal member 290 and hence absorbs a relatively larger volume of element(s), e.g., boron, of first braze material 328 compared to the rest of AM metal member 290 (e.g., around first cavity 320 or conduits 322, 324), which lowers its melting temperature. That is, when metal material around first cavity 320 or conduits 322, 324 absorbs element(s) of first braze material 328, they are too thick to have the element(s) change their physical characteristics. In contrast, blocking member 332 may become eutectic, i.e., it is a mixture of substances that melts at a temperature lower than the melting points of the separate constituents thereof. More particularly, first braze material 328 includes a "low melt" braze material typically used in repair of superalloy components that contains elements, such as but not limited to boron and/or or silicon, in an amount greater than otherwise found in superalloys to reduce the melting temperature of first braze material 328. When first braze material 328 is held at an elevated temperature (e.g., near or above its melting temperature), the melt suppressing elements diffuse into the surrounding area. This elevated temperature may occur from the insertion of braze material 328 into first cavity 320, or a separate heat treatment may be caried out to cause the diffusion. In any event, the diffusion lowers local concentrations of the elements around first braze material 328 in first cavity 320, and increases their concentrations in the surrounding superalloy, including in blocking member 332. This diffusion zone may be, for example, 50-254 micrometers (approximately 0.002-0.010 inches) into the superalloy, i.e., blocking member 332, which substantially increases the temperature at which blocking member 332 melts in a subsequent thermal cycle to melt first braze material 328.

As a result of the afore-described configuration, blocking member 332 can act as single-use (perhaps eutectic) valve that is openable (i.e., meltable, dissolvable or rupturable in a way to allow flow therethrough of liquefied braze material 328) at a predetermined temperature exceeding a melting temperature of first braze material 328. More particularly, braze reservoir 292 is thermally triggered, i.e., activated, by metal coupon 200 and/or component body 206 reaching a predetermined temperature greater than the melting temperature of first braze material 328. The predetermined temperature may not need to be higher than the melting temperature of blocking member 332 in order for it to open. For example, liquefied first braze material 328 may open blocking member 332 in conjunction with an increased pressure created by the predetermined temperature in first cavity 320, e.g., dissolving or forcibly rupturing blocking member 332. Alternatively, liquefied first braze material 328 may simply dissolve blocking member 332 in a manner that liquefied first braze material 328 can flow into first conduit 324. In another alternative, the predetermined temperature may be higher than the melting temperature of blocking member 332 in order to melt it to cause it to open. In any event, blocking member 332 may open by any of melting, dissolving and/or rupturing.

Blocking member 332 can have any shape and/or profile to block first conduit 324. A thickness of blocking member 332 may be dependent on, for example, materials of first braze material 328 and metal coupon 200. In one non-limiting example, block member 332 may have a thickness of less than 1270 micrometers (approximately 0.050 inches), and in another example, may have a thickness between 50-254 micrometers (approximately 0.002-0.010 inches). Blocking member 332 could be of a constant or a varying thickness and/or surface finish.

Figure 11:
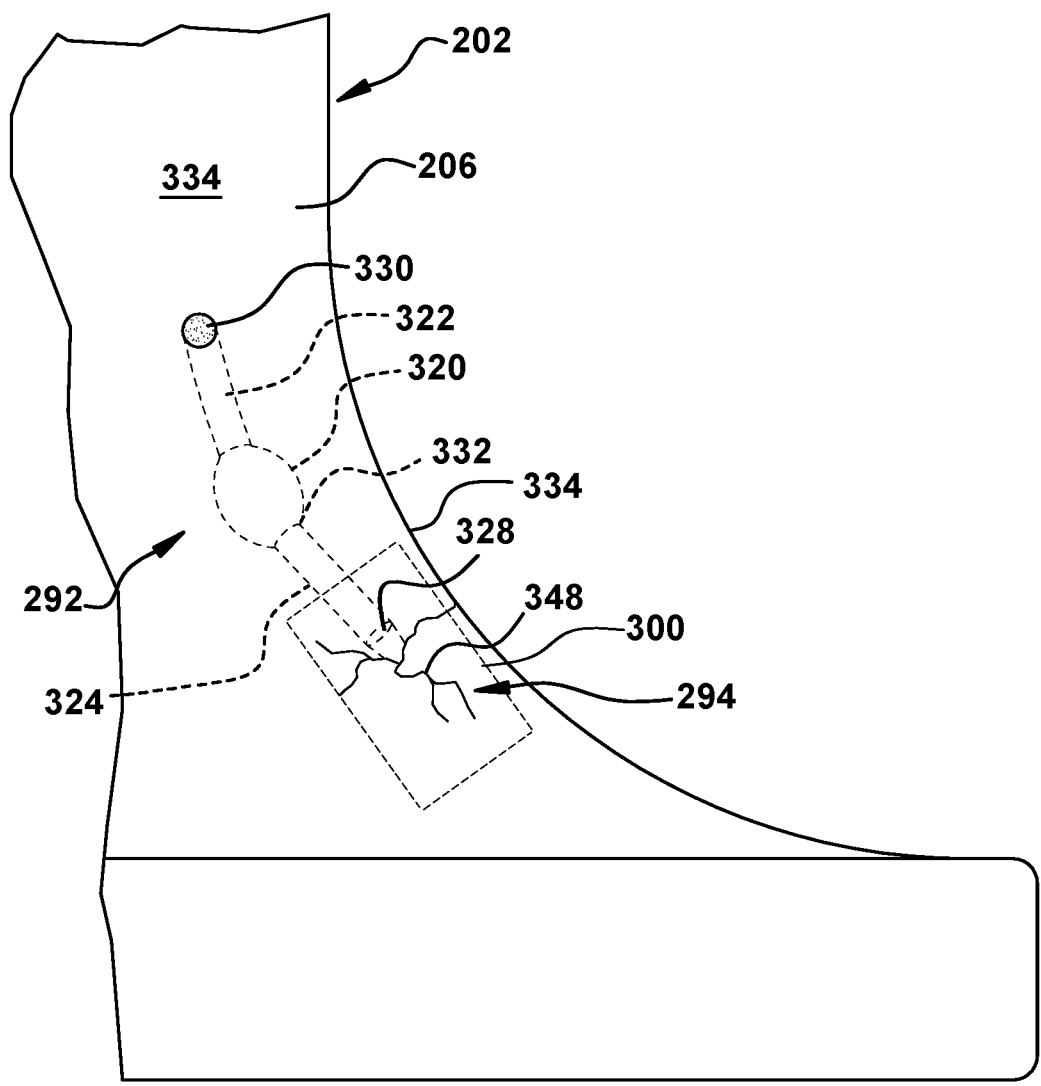
FIG. 11 shows a perspective view of a component including a braze reservoir therein according to embodiments of the disclosure.

With continuing reference to FIGS. 7A-D and component 202, braze reservoir 292 in component 202 is substantially similar to that described relative to metal coupon 200. FIGS. 3, 4 and 11 show braze reservoir 292 in component 202. In this case, braze reservoir includes first cavity 320 in body 206 (not AM metal member 290), second conduit 322 fluidly coupling first cavity 320 to an exterior surface 334 of body 206, and first conduit 324 fluidly coupling first cavity 320 to braze region 294. As noted, the cavities and conduits can be formed by programming melting beam sources 212, 214, 216, 218 of AM system 210 to not sinter metal in certain areas of component 202, leaving metal powder rather than solid material. Once component 202 is complete, the un-melted metal powder can be removed, leaving the cavities and/or conduits. Braze reservoir 292 also includes first braze material 328 in first cavity 320 and seal member 330 sealing second conduit 320 from an exterior of body 206. First braze material 328 is introduced (inserted) into first cavity 320 through second conduit 322 after additive manufacture of component 202. As noted, first braze material 328 can be inserted to first cavity 320 in a controlled atmosphere, e.g., within a non-reactive gas such as but not limited to argon and/or nitrogen. As noted, first braze material 328 can be in a powder form or a non-powder form such as a paste made of powder and a binder, e.g., Braz-Binder Gel available from Vitta. Once first braze material 328 is in first cavity 320, seal member 330 is formed to seal second conduit 322. Seal member 330 may include any structure capable of closing second conduit 322 at or near exterior surface 334 of body 206, i.e., after first braze material 328 has been introduced to first cavity 320 through second conduit 322. For example, seal member 330 may include a plug or weld in second conduit 322 at or near exterior surface 334 of body 206.

Braze reservoir 292 in component 202 may also include blocking member 332 blocking fluid communication through first conduit 324 between first cavity 320 and braze region 294 prior to exposure of metal coupon 200 or component body 206, wherever it is located, to a predetermined temperature exceeding a melting temperature of first braze material 328. Here, blocking member 332 may include any material having a melting temperature that is less than the material of body 206 and higher than or equal to the material first braze material 328. In certain embodiments, blocking member 332 becomes a eutectic mixture of a metal material of body 206 and at least one element of first braze material 328. In this case, blocking member 332 may be formed by additive manufacture with body 206, i.e., with the same material as body 206, and then absorption of element(s) of first braze material 328 once first braze material 328 is introduced into first cavity 320 (and a heat treatment is optionally performed), the melting temperature of blocking member 332 changes compared to the rest of body 206. As noted, blocking member 332 is a relatively thin layer of material compared to the rest of body 206 and hence absorbs a relatively larger volume of certain element(s), e.g., boron, of first braze material 328 compared to the rest of body 206 (e.g., around first cavity 320 or conduits 322, 324), which lowers its melting temperature. That is, when metal material around first cavity 320 or conduits 322, 324 absorbs element(s) of first braze material 328, e.g., boron, they are too thick to have the element(s) change their physical characteristics. In contrast, blocking member 332 becomes eutectic. In this manner, blocking member 332 can act as single-use, eutectic valve that is openable (i.e., meltable, dissolvable, or rupturable in a way to allow flow therethrough of liquefied braze material 328) at a predetermined temperature exceeding a melting temperature of first braze material 328.

Figure 7A:
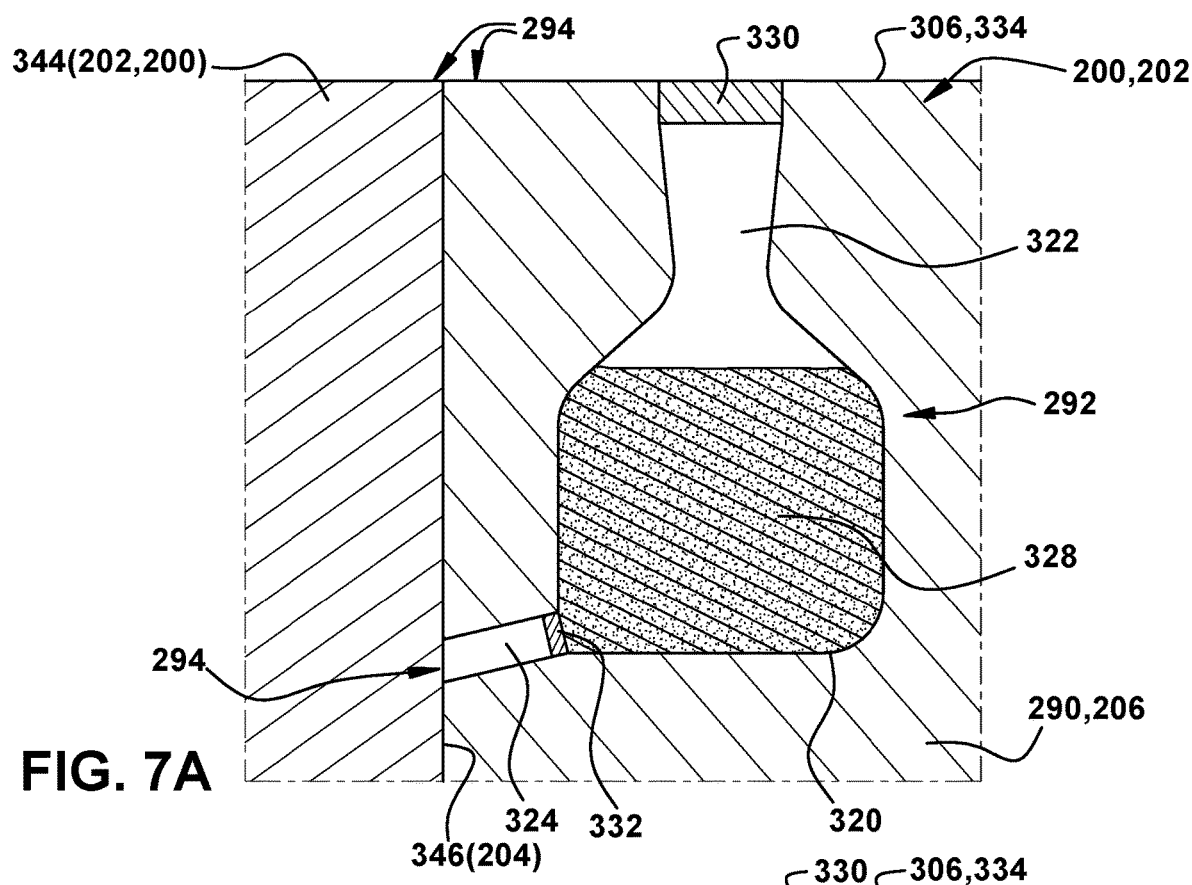
FIGS. 7A-D show cross-sectional views of a braze reservoir in a metal coupon or body of a component according to various embodiments of the disclosure.
Figure 7B:
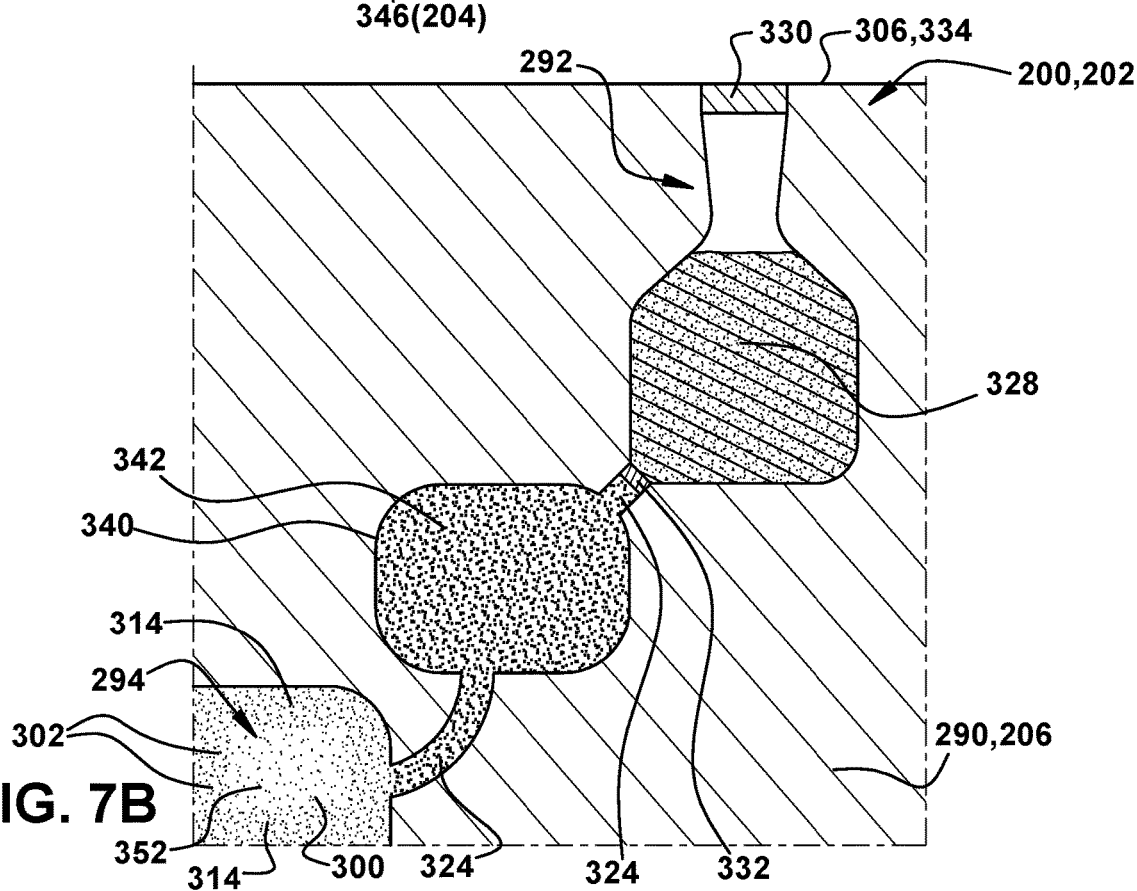
Figure 7C:
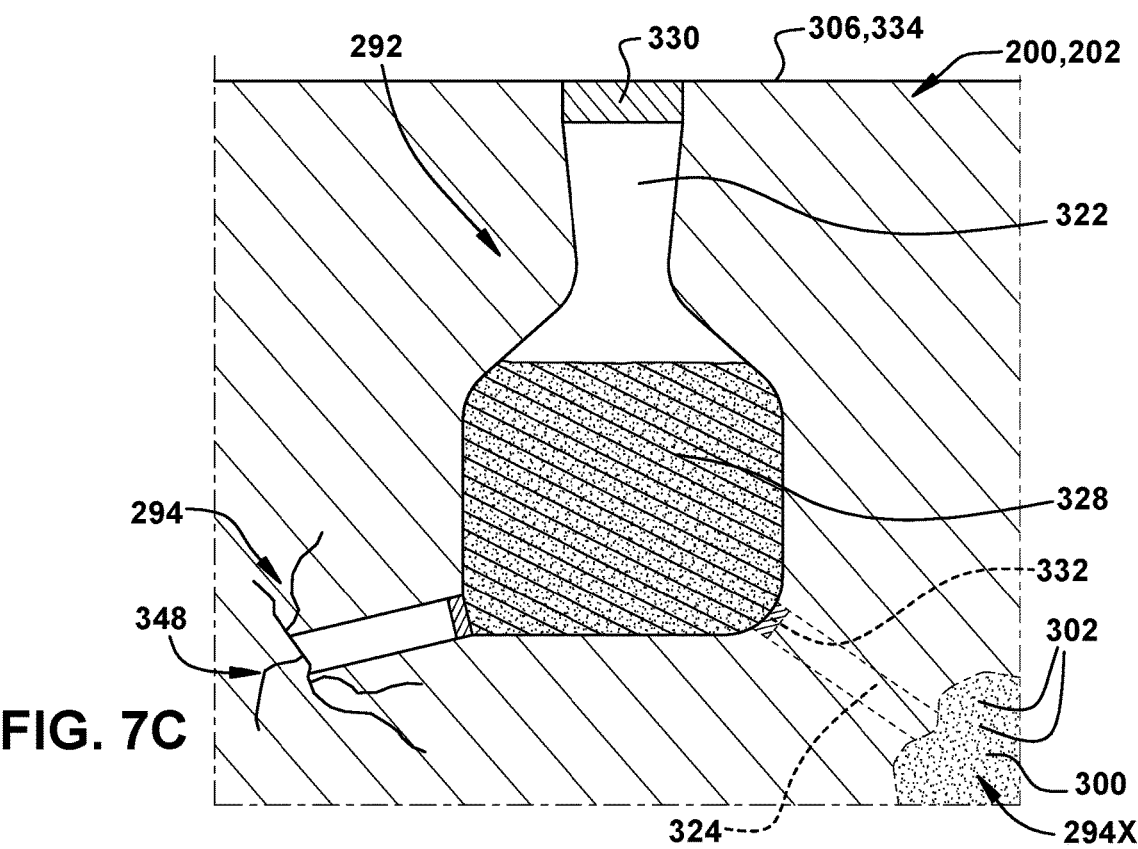
Figure 7D:
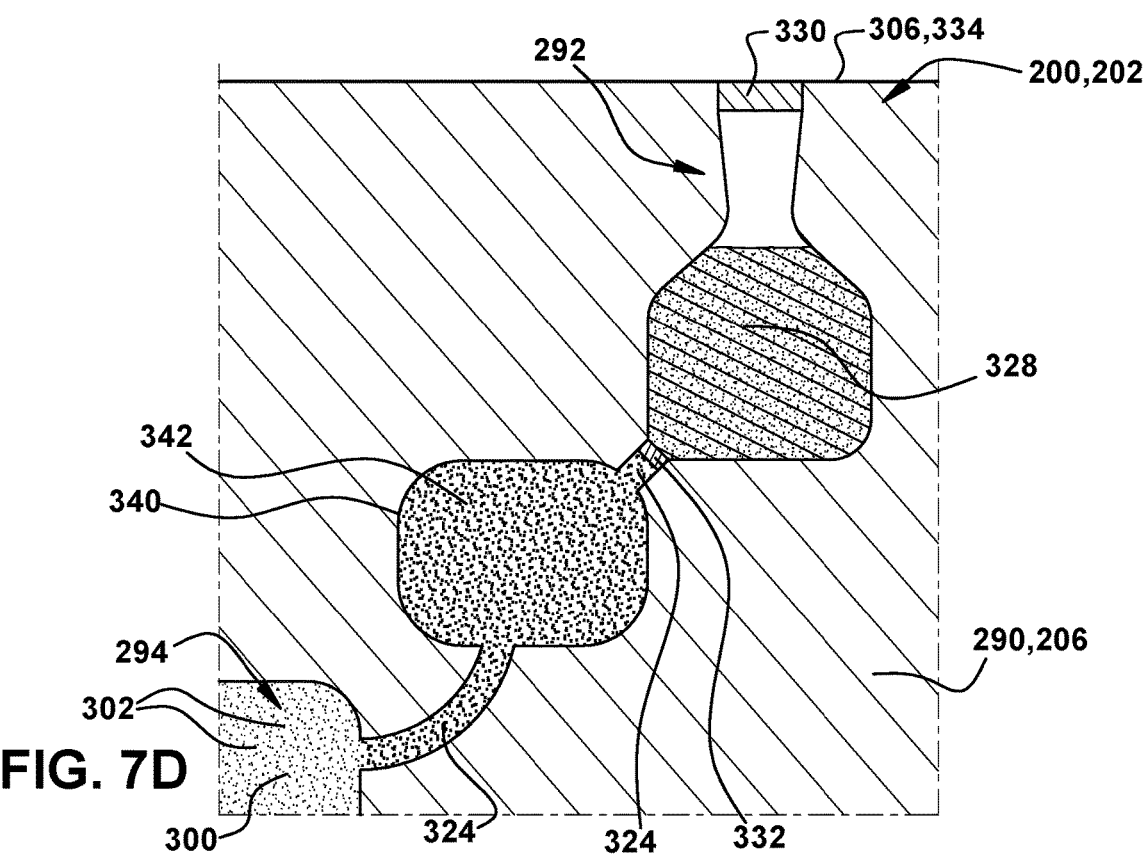

With reference to FIG. 7D, in an alternative embodiment that is applicable to metal coupon 200 or component 202 with braze reservoir 292, a second cavity 340 may be defined in AM metal member 290 or body 206. Second cavity 340 may be an enlarged area of first conduit 324 between first cavity 320 and braze region 294. Second cavity 340 has a second braze material 342 therein that is different than first braze material 328. In certain embodiments, second braze material 342 may have a higher melting temperature than first braze material 328, but low enough that liquefied first braze material 328 can direct second braze material 342 in solid or melted form to braze region 294. Second braze material 342 may include un-melted metal powder used to form metal coupon 200 or component 202, i.e., a superalloy metal powder. Here, rather than removing the un-melted metal powder, it remains in metal coupon 200 or component 202, after additive manufacture thereof.

Braze region 294 may take a variety of forms depending on the intended application of metal coupon 200, component 202 and/or braze reservoir 292. Notably, braze region 294 can be any area or location at which additional braze material may be desired to, for example, ensure all of a region to be brazed is filled with braze material, such as a joint 384 (FIGS. 10A-E) between parts or a porous region 300 used to direct liquefied braze material in a desired manner, and/or ensure an area of potential damage, e.g., cracking or other high-stress damage, is filled/repaired. For example, braze region 294 may include at least one of: as shown in FIGS. 7B and 7D, a porous region 300 within AM metal member 290 or body 206; or as shown in FIG. 7A, a contact interface 346 between AM metal member 290 or body 206 with another element; or as shown in FIG. 7C, a damaged area 348, e.g., a crack, in a portion of AM metal member 290 or body 206 of component 202; or as shown in FIG. 7A, a portion (e.g., coupon opening 204) of body 206 of component 202 in which AM metal member 290 (metal coupon 200) is located. Braze region 294, as shown in FIG. 7A, may also be an exterior surface 306 of AM metal member 290 of metal coupon 200 or an exterior surface 334 of body 206 of component 202, respectively. As will be further described, porous region 300 may have a variable porosity with two or more porous sub-regions 314, 352 (FIG. 7B) having different porosities, e.g., to direct braze material 328, 342, among other braze materials, in a desired manner.

Figure 10A:
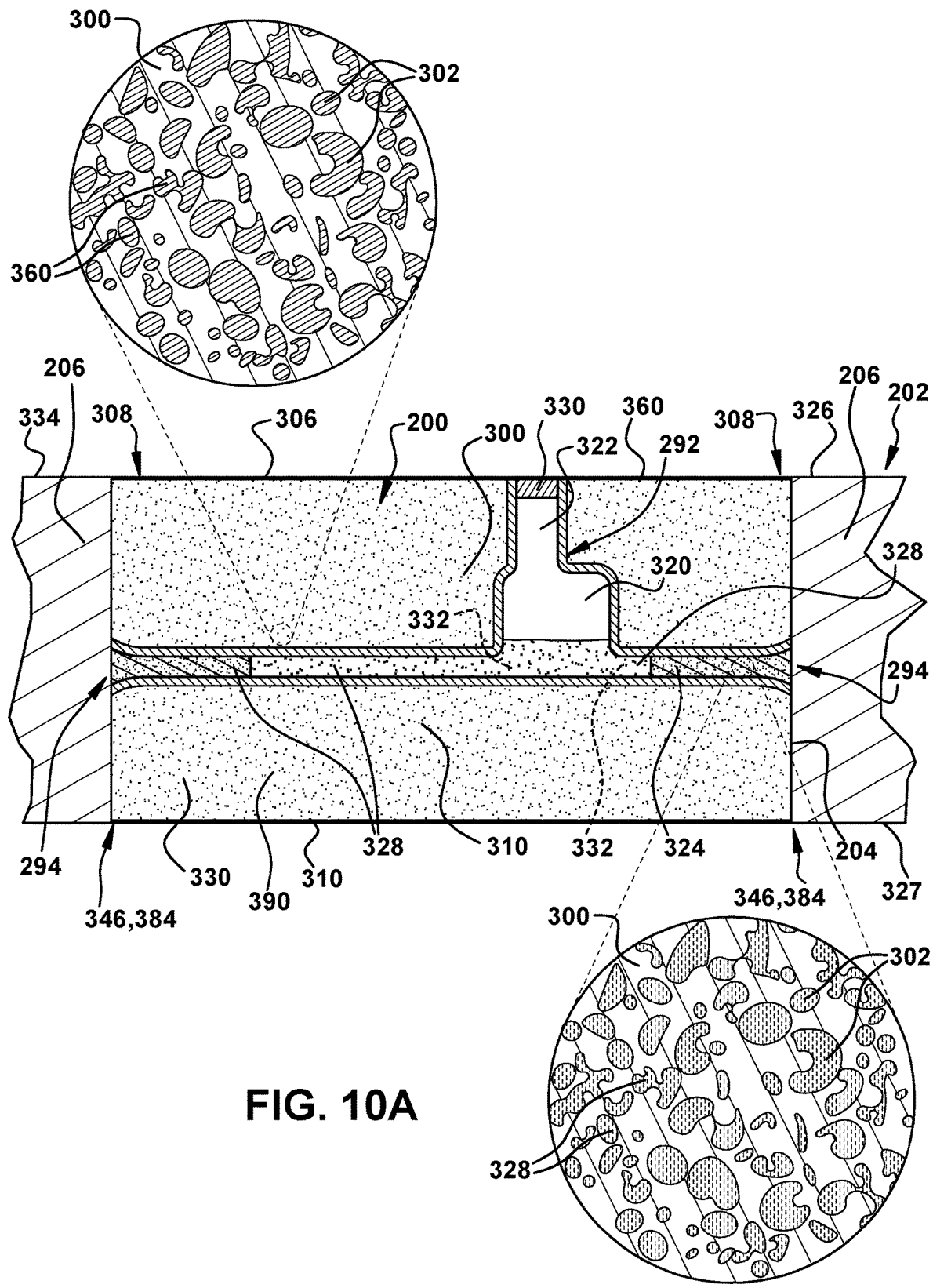
FIGS. 10A-E show enlarged cross-sectional views of a metal coupon in an opening in a body of a component according to embodiments of the disclosure.
Figure 10B:
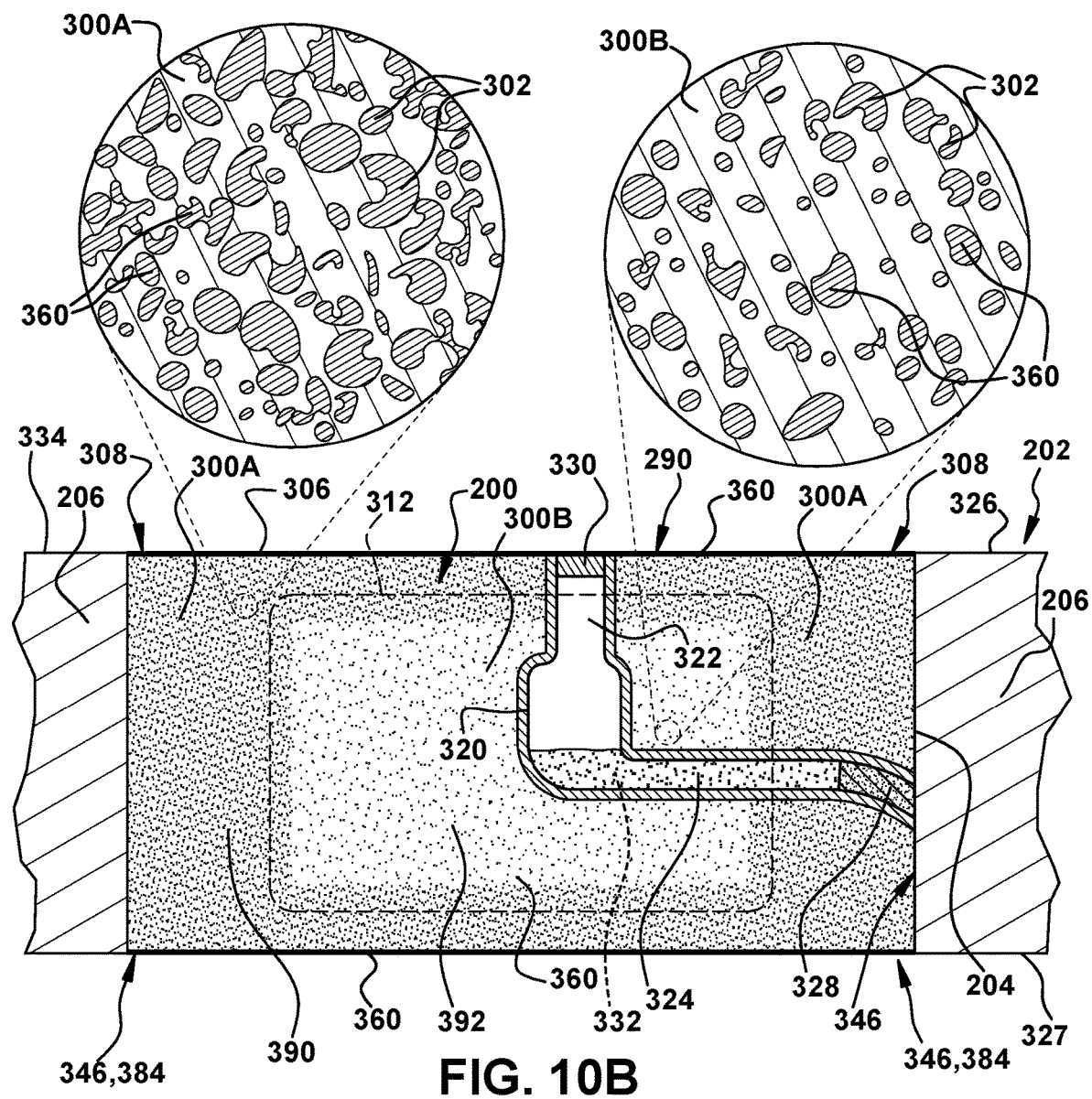

It will be noted that damaged area 348 may be an area in which damage is more likely but not guaranteed to occur, such as a high stress area in metal coupon 200, body 206 of component 202, or an area therebetween. For example, damaged area 348 may be a location, e.g., a corner, in metal coupon 200, body 206 of component 202, or an area therebetween, which is exposed to high stress and may be mended by filling with braze material(s) 328 and/or 342. Contact interface 346 can be between any parts in which a brazed joint 384 (FIGS. 10A-E) is desired. For example, as shown in FIG. 10B, contact interface 346 can be between AM metal member 290 of metal coupon 200 and coupon opening 204 in body 206 of component 202 in which AM metal member 290 is located. Here, braze reservoir 292 may provide additional braze to braze region 294 in the form of a joint between metal coupon 200 and coupon opening 204 of body 206, e.g., where braze normally applied to an exterior surface 306, 334 of metal coupon 200 and body 206, respectively, does not penetrate far enough into contact interface 346 to ensure an adequately brazed joint. Braze reservoir 292 can be arranged to deliver braze material(s) 328, 342 to any form of braze region 294 upon application of the predetermined temperature. Heat applied to first cavity 320 raises the pressure therein to cause liquefied braze material 328 to be forcibly moved into first conduit 324. While each braze reservoir 292 is illustrated with a single first conduit 324 to deliver liquefied braze material 328 to a single braze region 294, as shown in FIGS. 7C and 8D, it will be recognized that more than one first conduit 324 may be provided in any of the illustrated embodiments so more than one braze region 294 is provided with liquefied braze material 328, 342. In FIGS. 7C and 8D, a second braze region 294X is illustrated as a porous region 300, but it could be any form of braze region described herein.

FIGS. 8A-E show perspective views of an illustrative additively manufactured (AM) metal coupon 200 including AM member 290 having one or more porous regions 300 (with pores 302). Porous regions 300 are infiltrated with braze material. The liquefied braze material 328 (and perhaps 342) for porous regions 300 may be supplied by braze reservoirs 292 (making those porous regions 300 "braze region(s)" 294 of those braze reservoir 292). Alternatively, porous regions 300 may be supplied with another (third) braze material 360 in another manner than from braze reservoir 292, e.g., by application of braze material 360 to an exterior of metal coupon 200 and heating causing flow through gravity and/or capillary action. In another embodiment, porous regions 300 may be supplied with first braze material 328 (and perhaps second braze material 342) from braze reservoirs 292 and third braze material 360.

Figure 8A:
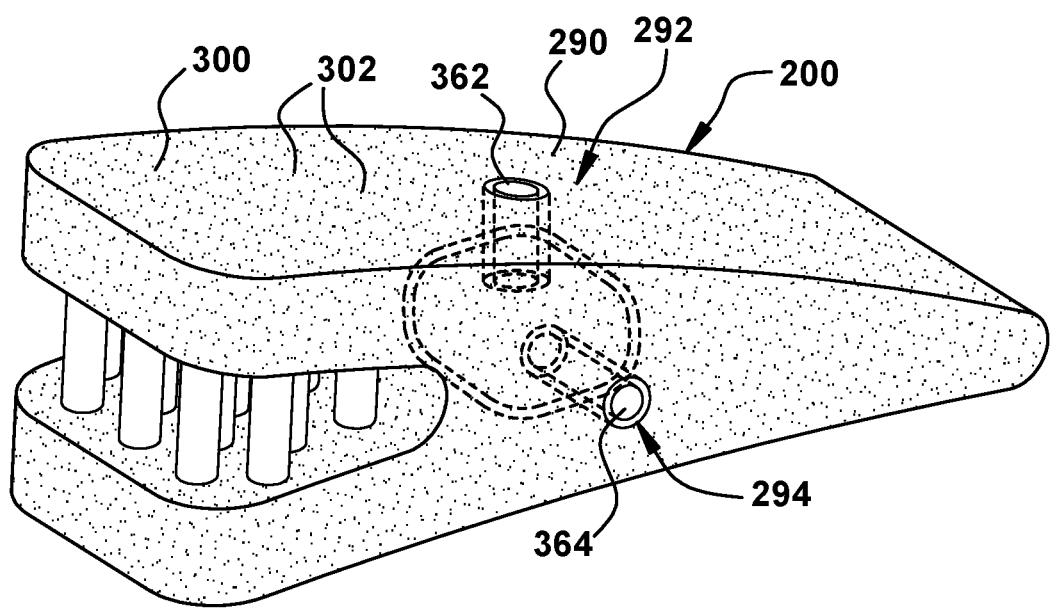
FIGS. 8A-E show perspective views of metal coupons including a braze reservoir according to embodiments of the disclosure.
Figure 8B:
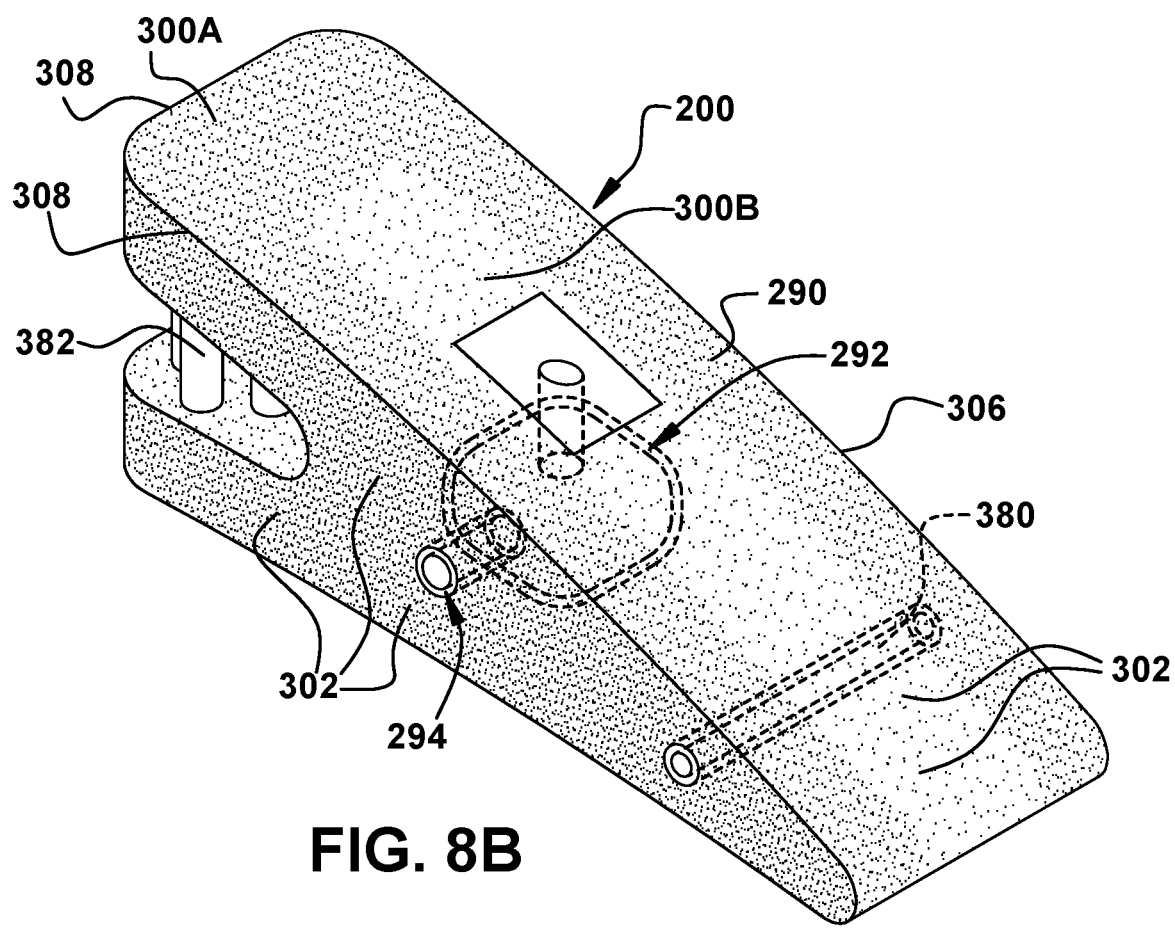
Figure 8C:
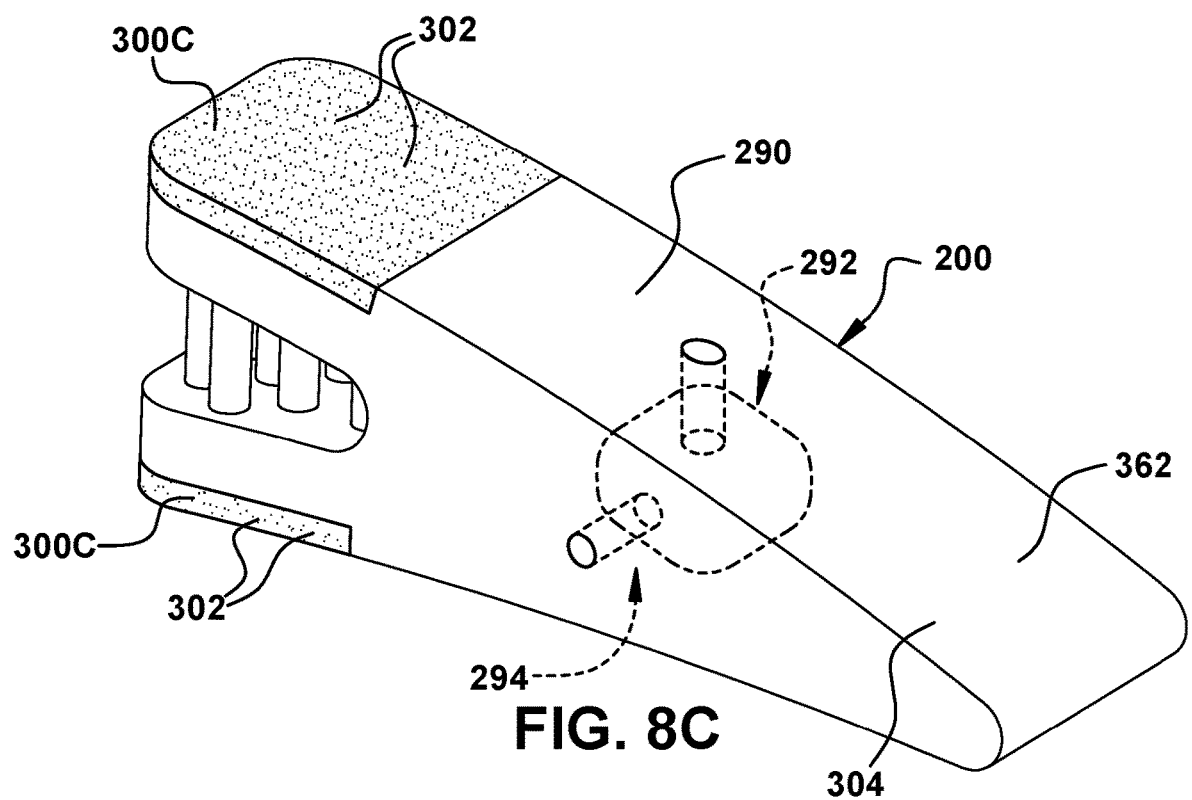
Figure 8D:
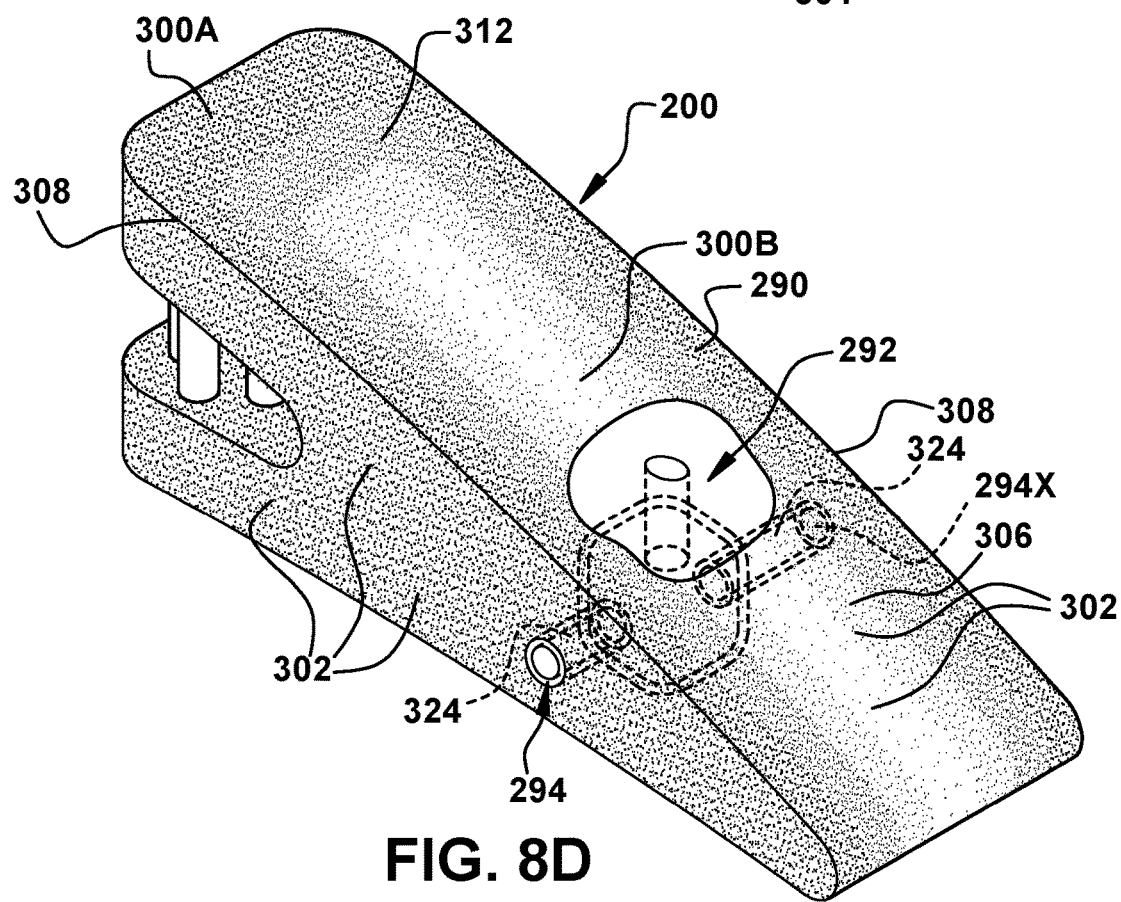
Figure 8E:
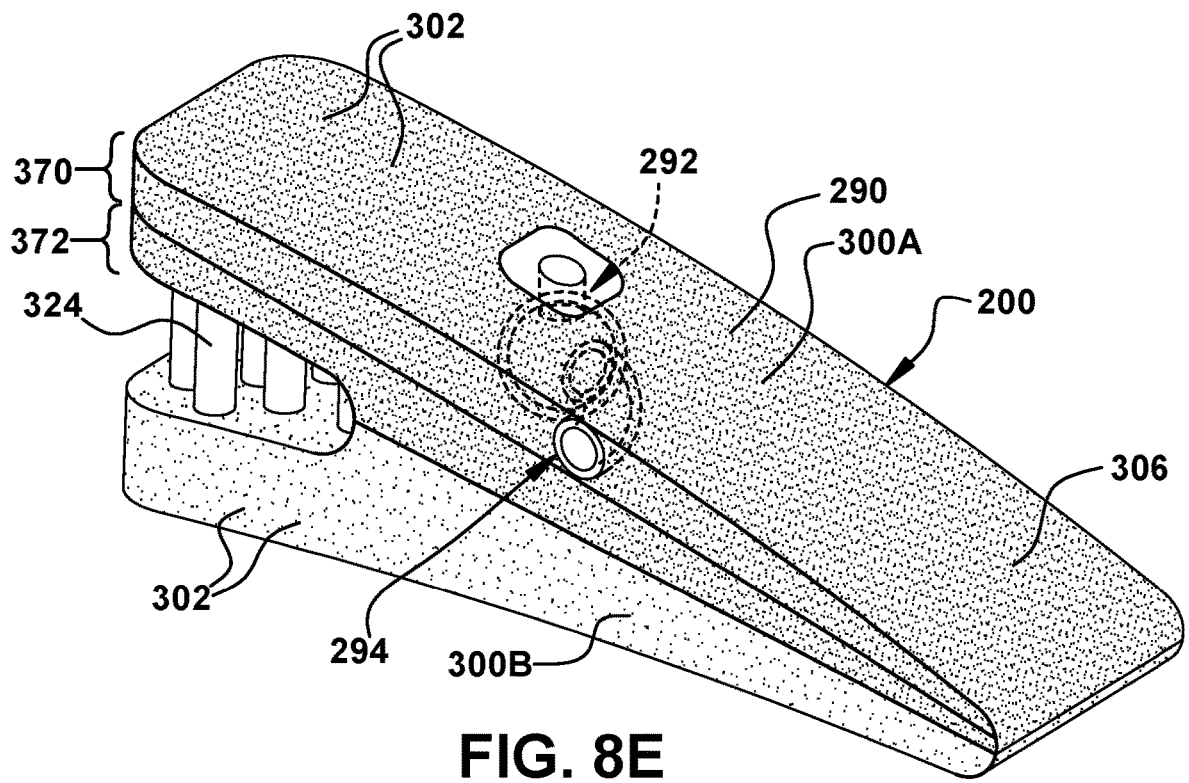

As shown FIG. 8A, metal coupon 200 may have a first porous region 300 having a first porosity. In FIG. 8A, metal coupon 200 includes a single porous region 300 with a single, first porosity. In FIG. 8A, the entire metal coupon 200 includes first porosity. Hence, each layer of metal coupon 200 has the same porosity. In FIGS. 8B and 8E, metal coupon 200 includes two porous region 300A-B each with a different porosity. In FIG. 8B, the two different porous regions 300A, 300B are layered internal and external regions with one being further inside metal coupon than the other, and in FIG. 8E, two different porous regions 300A, 300B are different sides of metal coupon 200. Areas within layers of metal coupon 200 that define regions 300A-B can be formed to include pores 302. In FIG. 8C, metal coupon 200 includes one or more porous regions 300C, each perhaps with the same or different porosity, and a solid region 304. Here, areas within layers of metal coupon 200 that define regions 300A-B can be formed to include pores 302, and areas within layer of metal coupon 200 that define solid region 304 are formed without pores 302. In FIG. 8D, metal coupon 200 includes variable porosity region 312 between (and perhaps including part of) first porous region 300A and second porous region 300B. Here, areas within layers of metal coupon 200 that define regions 300A-B or variably porous region 312 can be formed to include pores 302, e.g., of different size or number, to create the different porosities. The variable porosity region 312 may have any porosity that changes, e.g., increases, decreases and/or both increases and decreases. The change in porosity may be gradual or stepped or otherwise incremental. While variable porous region 312 is shown in FIG. 8D between internal and external porous regions 300A, 300B, a variable porous region can also be applied to the FIG. 8E version. Each porous region 300 may have a porosity between 2% to 50% open space volume to total volume of porous region 300, i.e., 2% to 50% open space with the other 50% to 98% solid. In other embodiments, each porosity may be between 10% to 40% open space volume to total volume of porous region 300, i.e., 10% to 40% open space with the other 60% to 90% solid. Other ranges of porosity are also possible. For example, porous regions 300 can have any porosity described herein.

Metal coupon 200 in FIGS. 8A-E are shown having a shape configured to be positioned in, as shown in FIGS. 3 and 4, opening 204 in trailing edge 158 or 184 of blade 132 or nozzle 126, respectively, or opening 204 in leading edge 156 or 182 of blade 132 or nozzle 126, respectively. Metal coupon 200 could also be in any tip (not shown) of blade 132 or platform 170 (shown), 174 of nozzle 126. It is emphasized, however, that metal coupons 200 can be employed in any opening 204 in any part of body 206 of any component 202. As noted, a "coupon opening 204 in body 206" may be any size void in body 206 up to an including a removed section of body 206, e.g., tip shroud.

As also shown in FIGS. 8A-E, braze reservoir 292 may be located in any location within metal coupons 200 to deliver braze material(s) 328, 342 where desired. Where braze reservoir 292 is defined in porous metal, as shown in FIG. 8A, cavities 320, 340 and/or conduits 322, 324 may be formed by a denser layer 362, 364 within porous regions 300, e.g., a braze barrier infiltration layer, surrounding the respective cavities 320, 340 and/or conduits 322, 324. Otherwise, dense areas, e.g., solid area, may be defined within porous metal to allow for definition of the cavities and conduits of braze reservoir 292 therein.

FIG. 8E shows one example of another embodiment in which braze reservoir 292 is removable from AM metal member 290. In this case, braze reservoir 292 may be formed in a section 370 of AM metal member 290 of metal coupon 200 that can be later removed once braze reservoir 292 has been used. That is, section 370 is provided for the main purpose of providing braze reservoir 292, but it is not otherwise necessary to component 202 or metal coupon 200. Once braze reservoir 292 is used, section 370 of AM metal member 290 in which it is located can be removed, e.g., by grinding, electric discharge machining, etc. Remaining section 372 of AM metal member 290 may not include any part of braze reservoir 292. A similar approach can be used for component 202, e.g., by forming braze reservoir 292 in a section of component 202 that is not required for the completed component 202 and removing the section after braze reservoir 292 is used.

As will be described further herein, and as shown in FIGS. 3, 4, 9C-G, 10A-E, braze material 360 (outside of braze reservoir 292) infiltrates into porous regions 300 of metal coupons 200 to couple metal coupon 200 in coupon opening 204 of body 206 of component 202. The different porosities and/or variable sub-regions are different from each other in terms of at least one of the following characteristics: percentage of open space volume to total volume, pore shape, pore size, number of pores, and pore connectivity. Each porous region 300 or porous sub-region may have a porosity as previously described herein. The different porosities allow control of braze material 360 uptake, i.e., through capillary action into metal coupon 200. To illustrate, with regard to FIG. 8D, porous region 300 includes an outer porous region 300A adjacent exterior surface 306 of AM metal member 290 that has a higher porosity than an inner porous region 300B. Hence, outer porous region 300A is configured to accept more braze material 360 therein than inner porous region 300B.

Referring to FIGS. 3, 4, 8A-E, 9A-G and 10A-E, embodiments of a method according to the disclosure will now be described. The method may include repairing a component 202. FIGS. 9A-G show perspective views of the method according to embodiments of the disclosure.

Figure 9A:
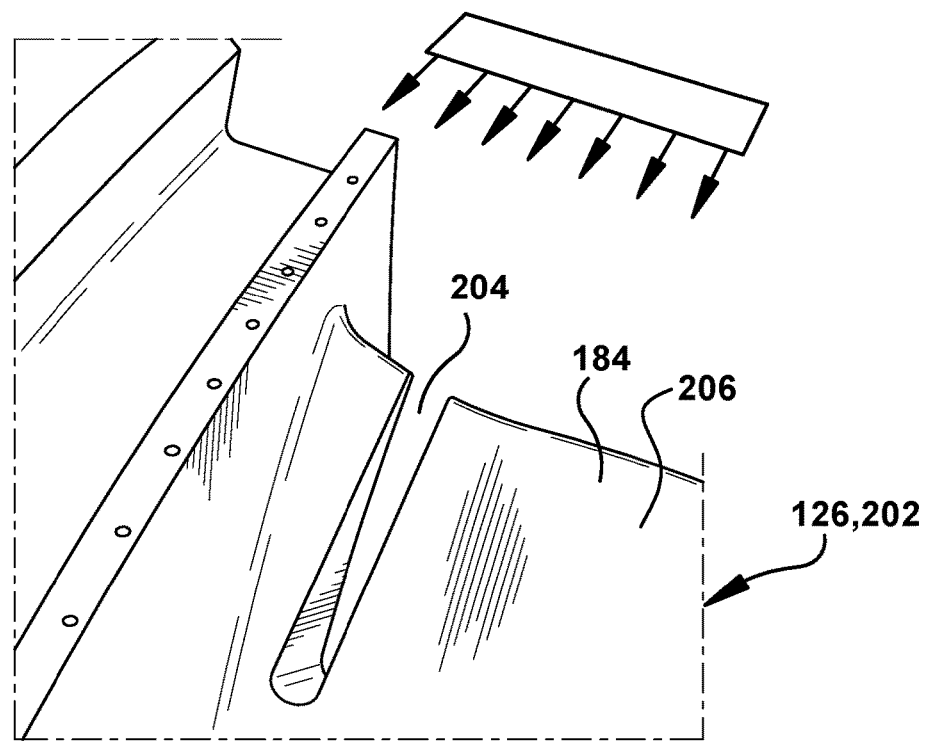
FIGS. 9A-G show perspective or cross-sectional views of methods according to various embodiments of the disclosure.

FIG. 9A shows creating coupon opening 204 in body 206 of component 202. Coupon opening 204 eventually receives a metal coupon 200. Coupon opening 204 may have any shape desired. In certain applications, coupon opening 204 is created by removing a damaged part of body 206 of component 202, but coupon opening 204 can also be in an original version of component 202, e.g., at a location that is challenging to manufacture with the rest of component 202. In the non-limiting example shown, coupon opening 204 is in a trailing edge 184 of a nozzle 126. FIG. 9A also shows creating a model of coupon opening 204. The model creating may include using any now known or later developed three-dimensional scanner (not shown, see arrows) to scan and create a digitized representation of coupon opening 204 relative to body 206 of component 202. As the process of scanning and modeling a part is well known in the art, further details are omitted so the reader can focus on the salient aspects of the disclosure.

FIGS. 5, 7A-D and 8A-E show additively manufacturing metal coupon 200 for inserting into coupon opening 204 in body 206 of component 202. The additive manufacturing includes forming AM metal member 290 having braze reservoir 292 therein, as described herein. Summarizing, braze reservoir 292 includes first cavity 320 in AM metal member 290, second conduit 322 fluidly coupling first cavity 320 to exterior surface 306 of AM metal member 290, and first conduit 324 fluidly coupling first cavity 320 to braze region 294. Braze reservoir 292 may also include a blocking member 332 blocking fluid communication through first conduit 324 between first cavity 320 and braze region 294. Blocking member 332 blocks fluid communication through first conduit 324 between first cavity 320 and braze region 294 prior to exposure of blocking member 332 to a predetermined temperature exceeding a melting temperature of first braze material 328.

The additive manufacture may include any AM process described herein to manufacture porous metal coupon(s) 200 (or component 202), e.g., with porous or dense metal, and braze reservoir 292. The additive manufacturing may include manufacturing metal coupon(s) 200 to generally match that of coupon opening 204, or to have a near net shape of coupon opening 204 based on the model of coupon opening 204. As used herein, "near net shape" indicates metal coupon 200 has an outer shape after manufacture that, when positioned in coupon opening 204, is very close to surface(s) of body 206 required to couple metal coupon 200 in coupon opening 204, e.g., with selected braze material(s) and minimal required finishing methods, like machining or grinding. The use of porous region 300 in metal coupon 200, however, accommodates greater joint gap dimensional variance compared to solid coupons with narrow gaps for braze material because the porous regions provide improved braze material grasp and hold despite the larger gaps. While metal coupon 200 is shown in FIGS. 9C-G as being additively manufactured with the shapes from, for example, the FIGS. 8A-E embodiments, it may take any form described herein.

In accordance with embodiments of the disclosure, porosity of porous region 300, or sub-regions thereof, in metal coupon 200 is controlled, i.e., customized, to control flow of braze material 360 therein during a subsequent brazing process that couples metal coupon(s) 200 into coupon opening 204 (FIGS. 3-4, 9E-G) in body 206 (FIGS. 3-4, 9E-G) of component 202 (FIGS. 3-4, 10A-E). Each porous region 300 or sub-regions may be customized in terms of any of the afore-described characteristics that impact porosity. A shape and/or location of porous regions 300 or sub-regions thereof can be arranged to direct braze material as desired. For example, in FIGS. 8A-B, an entirety of metal coupon 200 includes a uniform porous region 300 so braze material 360 would be distributed uniformly therein. In contrast, in FIG. 8D, metal coupon 200 includes outermost porous region 300A near an edge 308 of metal coupon 200 where it would couple with coupon opening 204 (FIGS. 3-4) and a different, inner porous region 300B with a different porosity, e.g., distal from edge 308. In this manner, braze material 360 would be distributed in different ways in each porous region, resulting in different physical characteristic(s) of metal coupon 200 in different regions thereof. More particularly, any number of different porous regions and/or sub-regions can be used to create at least one different physical characteristic in component 202 that includes metal coupon 200, such as: joint adhesive bond strength, stress/strain resistance, ductility, wear resistance, oxidation resistance, thermal conductivity, electrical conductivity, surface roughness, hardness, and mass. In a non-comprehensive list of possibilities, metal coupon 200 may include a higher porosity in one porous region to direct more braze material therein through capillary action compared to other solid regions of metal coupon 200 to control at least one physical characteristic of component 202. In another embodiment, metal coupon 200 may include a lower porosity in one porous region to direct less braze material therein through capillary action compared to other solid regions of metal coupon 200 to control at least one physical characteristic of component 202. In other embodiments, metal coupon(s) 200 may include two or more porous regions that collectively make up an entirety of metal coupon 200. Any arrangement of porous regions and/or sub-regions is possible to create the desired braze material 360 flow and infiltration.

Figure 9B:
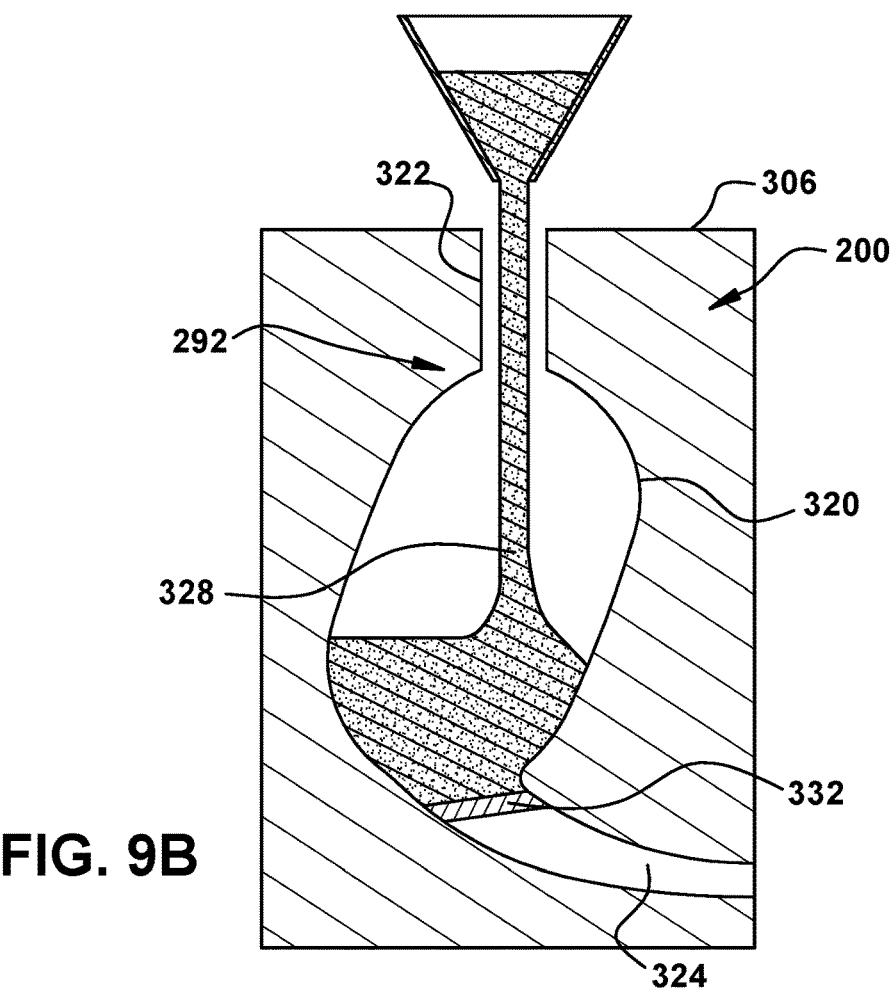

In certain embodiments, the additive manufacturing may also include a forming any variety of improvements for component 202 including, for example, structures not previously present in the removed, damaged part. For example, as shown in FIG. 8B, the additive manufacture may optionally include forming a cooling passage 380 in metal coupon 200. Cooling passage 380 may extend in metal coupon 200 in any manner, e.g., in a serpentine path therein or extending through exterior surface 306 of metal coupon 200. In another example, shown for example in FIG. 8B, the additive manufacture may optionally include forming one or more support and/or cooling structures 382 (e.g., pin/fins) (perhaps with cooling passages (not shown) therein) in metal coupon 200. Any advantageous internal structural changes can be made in metal coupon(s) 200. Any now known or later developed post-additive manufacture finishing processing may be optionally performed on metal coupon(s) 200, e.g., abrading to smooth and blend surfaces thereof. Advantageously, the teachings of the disclosure may remove the need for other finishing steps typically used to address residual stresses present in the material post additive manufacturing, e.g., peening, heat treatment, hot isostatic pressing (HIP), among others. FIG. 9B shows inserting a first braze material 328 in first cavity 320 through second conduit 322. First braze material 328 may be introduced into first cavity 320 through second conduit 322 (after additive manufacture of metal coupon 200) in any now known or later developed manner, e.g., forced gas flow, gravity feed, vibration feed, etc. First braze material 328 may include any of the braze materials listed below. First braze material 328 can be introduced to first cavity 320 in a controlled atmosphere, e.g., within a non-reactive gas such as but not limited to argon and/or nitrogen. As noted, first braze material 328 can be in a powder form or a non-powder form such as a paste made of powder and a binder, e.g., Braz-Binder Gel available from Vitta. In any event, blocking member 332 retains braze material 328 in first cavity 320. The inserting may also include performing a heat treatment to diffuse melting temperature reducing element(s) of braze material 328 into blocking member 332, as described herein.

Figure 9C:
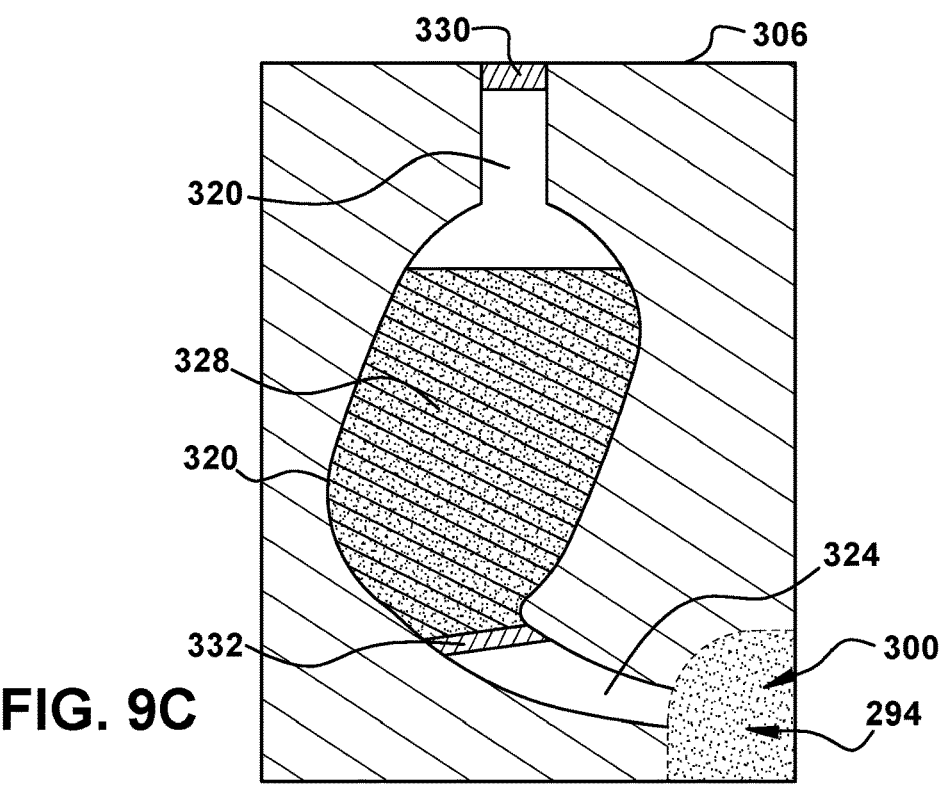

FIG. 9C shows sealing second conduit 322 from the exterior of AM metal member 290. That is, once first braze material 328 is in first cavity 320, seal member 330 is formed to seal second conduit 322. As noted, seal member 330 may include any structure capable of closing second conduit 322 at or near exterior surface 306 of AM metal member 290, i.e., after first braze material 328 has been introduced to first cavity 320 through second conduit 322. For example, seal member 330 may include a plug or weld in second conduit 322 at or near exterior surface 306 of AM metal member 290.

Figure 9E:
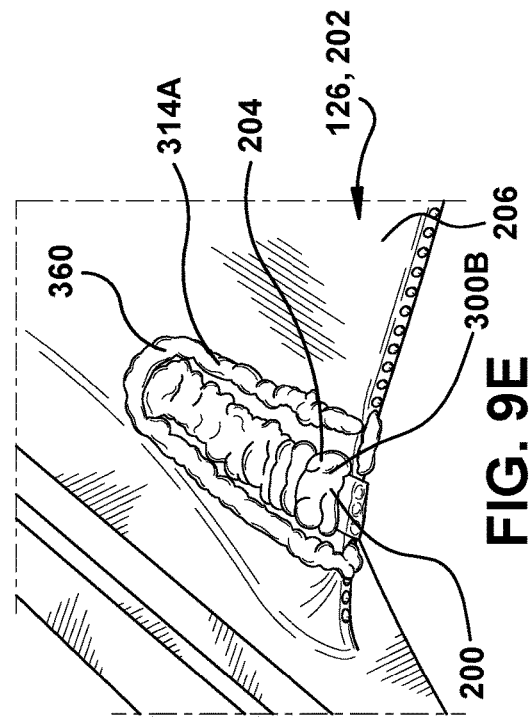
Figure 9G:
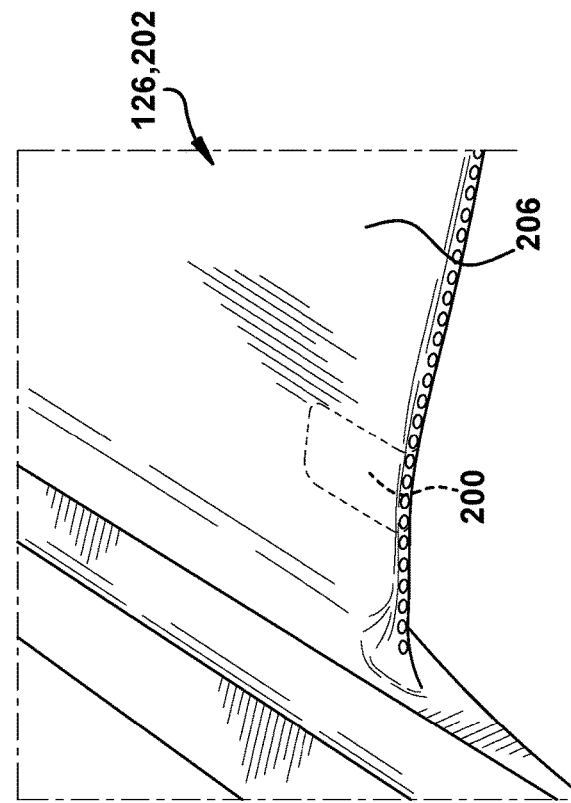
Figure 9D:
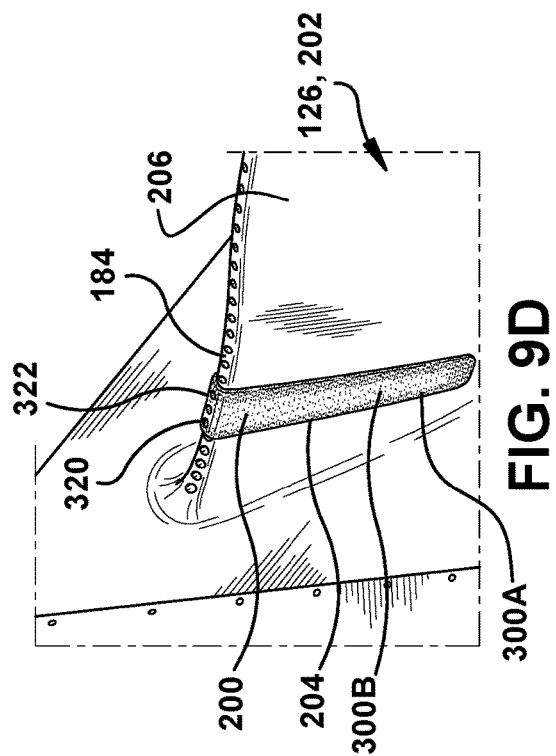
Figure 9F:
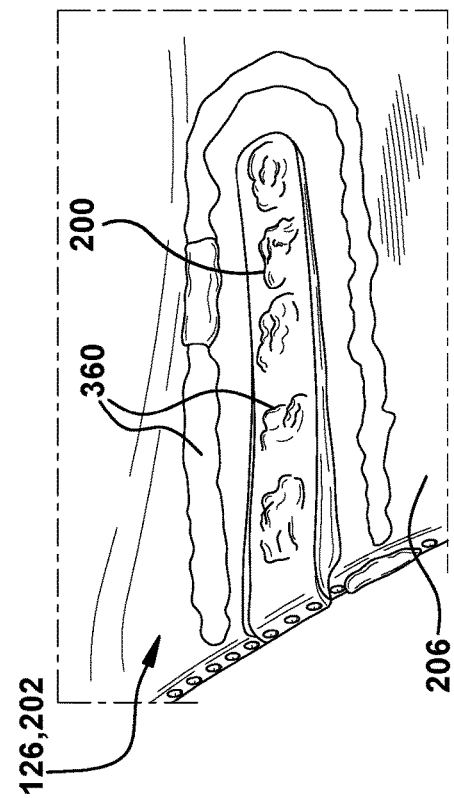

FIGS. 9D and 9E show positioning metal coupon 200 in coupon opening 204 in body 206 of component 202. Metal coupon 200 may be positioned in coupon opening 204 in body 206 in any now known or later developed manner, e.g., using robotic arms or manually. Where necessary, metal coupon 200 may be held in place in any desired manner, e.g., adhesive, male-female connectors, clamps, etc. FIGS. 9E-G also show infiltrating metal coupon 200 with braze material 360 to couple the metal coupon in coupon opening 204 in body 206, i.e., by performing a brazing process. FIGS. 10A-E show enlarged cross-sectional views of metal coupon 200 in coupon opening 204 of body 206 of component 202 and including a variety of (used) braze reservoirs 292 according to embodiments of the disclosure. Braze material 328 and/or 360 may include any now known or later developed brazing composition, as described herein. The infiltrating may include any now known or later developed brazing process such as using a vacuum brazing system, induction brazing system, and/or inert gas atmosphere heating system and related techniques. In one non-limiting example, the brazing may include, for example, applying braze material 360 (FIG. 9D) and applying heat (FIG. 9E) to cause it to flow into, through and around metal coupon 200 through capillary action.

The infiltrating of braze material 360 is based at least on a characteristic of the porosity or porosities of porous region(s) 300. For example, as shown in FIGS. 8B and 10A, the infiltrating may include causing braze material 360 to travel through and infiltrate porous region 300. The porosity of porous region 300 dictates how braze material 360 flows. For example, as shown in FIGS. 8B and 10B, the infiltrating may include causing braze material 360 to travel through and infiltrate an outer porous region 300A based on the characteristic of its first porosity, and travel through and infiltrate second, outer porous region 300B based on the characteristic of its second porosity. As shown in FIGS. 8D and 10B, where variable porosity sub-region 312 is present with two or more porous regions 300A, 300B having different porosities, braze material 360 may travel through and infiltrate variable porosity region 312 based on characteristic(s) of variable porosity sub-region 312 (e.g., gradient of the porosity, stepped porosity, among other things). As shown in FIGS. 8D and 10B, where variable porosity sub-region 312 includes and is between inner and outer porous regions 300A-B, the infiltrating may include causing braze material 360 to travel through and infiltrate outer porous region 300A based on the characteristic of its first porosity, travel through and infiltrate variable porosity sub-region 312 between regions 300A-B based on characteristic(s) of that variable porosity region 312 (e.g., gradient of the porosity, stepped porosity, among other things), and travel through and infiltrate inner porous region 300B based on the characteristic of its second porosity.

The option of different porosities in porous region(s) 300 results in different braze material 360 flow and infiltration. As a result of the brazing process, porous region(s) 300 or sub-regions of different porosities with braze material 360 therein may have at least one different physical characteristic. In one example, shown in FIGS. 8D and 10B, the porosity of a first, outer porous region 300A may be higher (i.e., less dense) than the porosity of second, inner porous region 300B. In this case, infiltrating includes infiltrating first, outer porous region 300A with more braze material 360 than second, inner porous region 300B. Depending on the braze material 360 used, among other factors, the different porosities allow for customization of at least one physical characteristic of component 202, such as: joint adhesive bond strength, stress/strain resistance, ductility, wear resistance, oxidation resistance, thermal conductivity, electrical conductivity, surface roughness, hardness, and/or mass. In addition, the multi-flow paths of the braze material using porous regions 300 may decrease the likelihood of a lack of fill and/or voids along a brazed joint compared to the conventional narrow gap-filling brazing process, and due to tight manufacturing tolerances required for narrow gap brazing.

In certain embodiments, different braze materials 360 may be used in different parts of metal coupon(s) 200, providing further customization of the coupling of metal coupon(s) 200 in component 202. For example, referring to FIG. 10C, a braze material 360A may be used on a first metal part or side 326 of component 202 and another braze material 360B, different than braze material 360A, may be used on a different part or side 327 of component 202. In one example, referring to FIGS. 3, 4 and 10A-D, first metal part or side 326 of component 202 may be a first (concave, pressure) side outer walls 152, 178 of airfoil 150, 176 and second or side 327 of component 202 may be a second (convex, suction) side outer walls 154, 180 of an airfoil 150, 176. The different braze materials 360A, 360B, in addition to different porous region(s) 300, on the different part or sides 326, 327 can be customized for the anticipated environment of component 202 at those locations. As will be recognized, the number of variations of braze materials and/or porous regions/sub-regions are very large, making it possible to address a wide variety of difficult repair situations.

In addition to the above-described infiltrating of braze material 360 to couple metal coupon 200 in coupon opening 204, embodiments of the disclosure also use braze reservoir 292 to provide additional braze material 328 (342) to braze regions 294 where advantageous. As noted, FIGS. 10A-E show some examples of braze reservoirs 292 in metal coupons 200. FIG. 11 shows a partial perspective view of an illustrative component 202, e.g., an airfoil as in FIGS. 3-4, including a braze reservoir 292. Braze reservoir 292 may be used at the same time as the above-noted infiltrating of braze material 360 to couple metal coupon 200 into coupon opening 204, or later, during use of component 202 with metal coupon 200 therein, e.g., to heal damaged area 348. Braze reservoir 292 is used by heating AM metal member 290 to a predetermined temperature exceeding a melting temperature of first braze material 328, causing first braze material 328 to liquefy and blocking member 332 to open and the liquefied first braze material 328 to flow through first conduit 324 to infiltrate braze region 294. Liquefied first braze material 328 flows under pressure based the pressure increase in first cavity 320 created by the heating. The pressurized liquefied first braze material 328 thus may infiltrate a variety of braze regions 294 that may not normally receive liquefied braze material 360 entering through gravity forces and/or capillary action.

FIGS. 10A-E and 11 show liquefied first braze material 328 flowing through first conduit 324 (or solidified partly in first conduit 324). Some of first braze material 328 may also remain in first cavity 322, i.e., after it solidifies. However, in response to metal coupon 200 or body 206 exceeding the predetermined temperature, first cavity 320 is at least partially open space. Where second braze material 342 is used, the predetermined temperature may also exceed a melting temperature thereof. The predetermined temperature may be selected to be within a range of the heat used during the infiltrating steps to couple metal coupon 200 in coupon opening 204, or a range experienced during use of component 202, e.g., when damage area 348 is expected to occur. The predetermined temperature can be controlled by controlling constituents of first braze material 328 and/or blocking member 332, and the physical configuration of blocking member 332, e.g., thickness, width, chemical constituents, etc. When the predetermined temperature of metal coupon 200 or component 202, whichever braze reservoir 292 is located, exceeds the melting temperature of first braze material 328, blocking member 332 opens fluid communication through first conduit 324. For example, as shown in FIG. 11, in response to body 206 exceeding the predetermined temperature, first braze material 328 liquefies, causing liquefied first braze material 328 (perhaps with some of blocking member 332 material therein) to flow through first conduit 324 to infiltrate braze region 294, which is shown as a damaged area 348 in FIG. 11. When used in body 206 of component 202, braze reservoir 292 may provide self-healing, e.g., for internal cracks, during use of the component or during heat treatment without additional processing. As shown in FIG. 7D, where second cavity 340 is defined in metal coupon 200 or body 206 (i.e., in first conduit 324 between first cavity 320 and braze region 294), second braze material 342 therein is different than first braze material 328. Here, the liquefied first braze material 328 flows through first conduit 324 and mixes with at least a portion of second braze material 342 such that the mixed liquefied first braze material 328 and second braze material 342 infiltrate braze region 294. Note, second braze material 342 may have a higher melting temperature than first braze material 328, requiring a temperature higher than the predetermined temperature to melt it. In such a case, some of second braze material 342 will liquefy, some of second braze material 342 will be entrained with the flow (mixed with liquefied first braze material 328) into braze region 294, and some of second braze material 342 will be left behind.

Figure 10C:
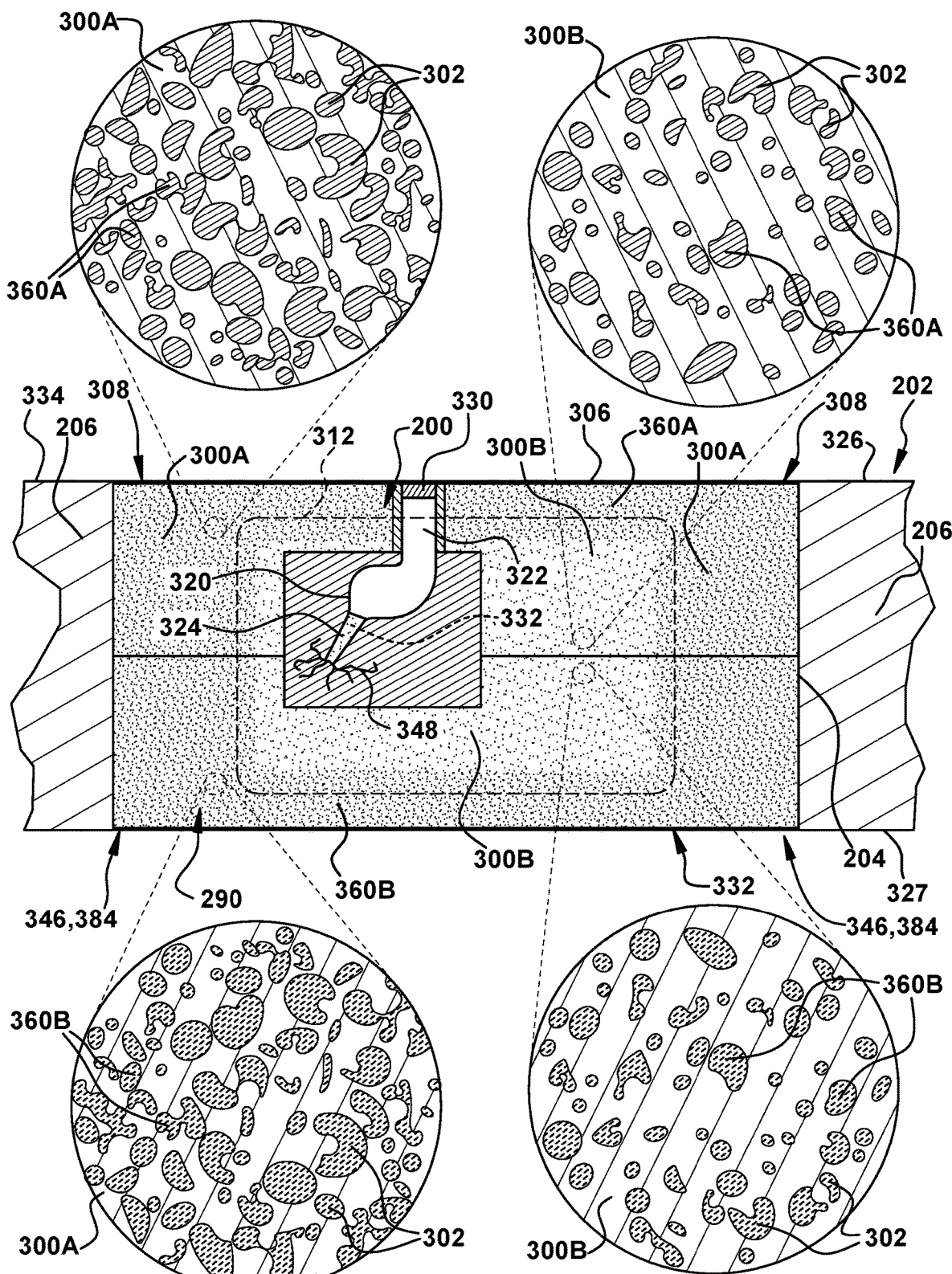
Figure 10D:
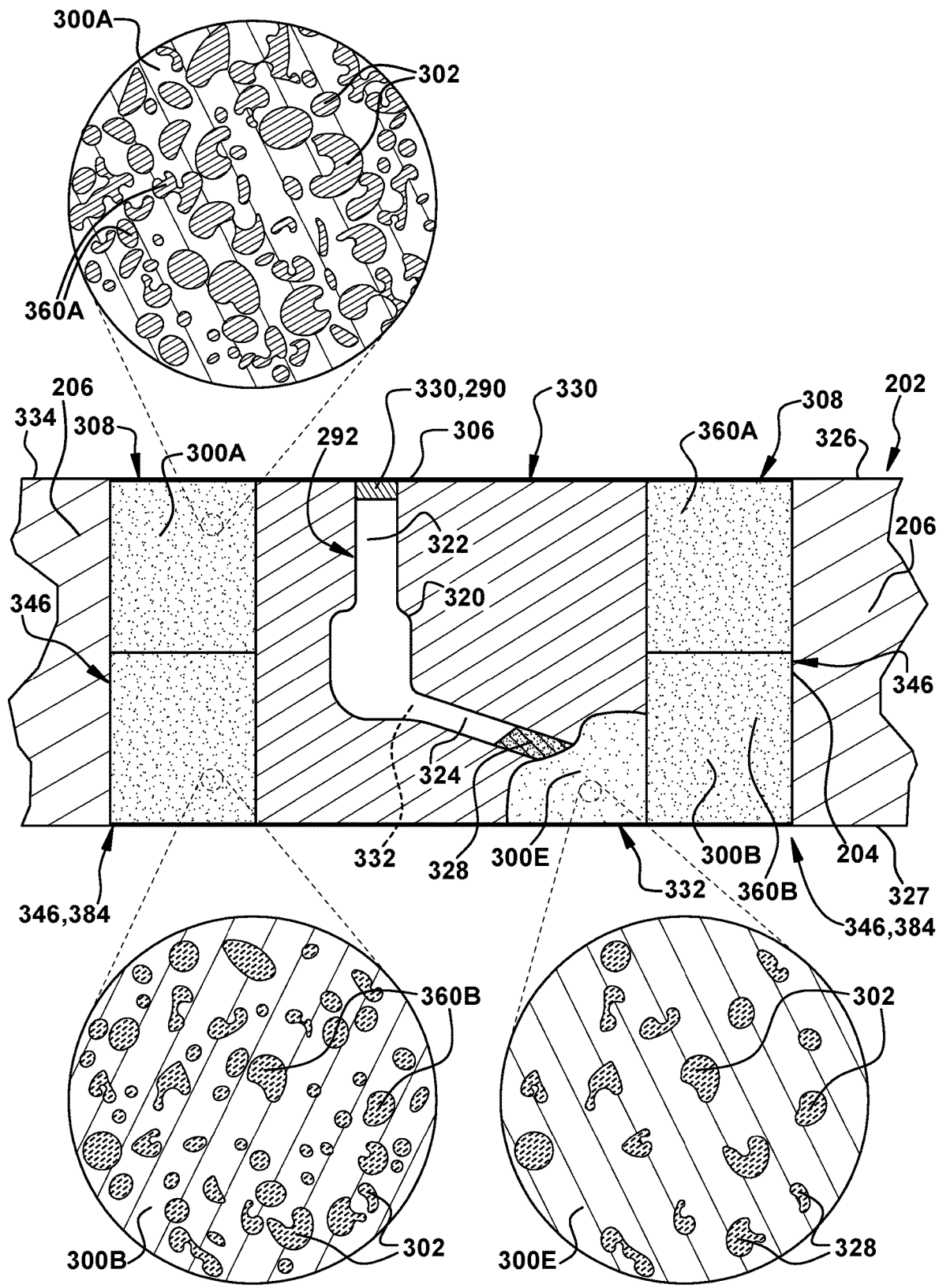

As noted, braze region 294 can take a variety of forms. FIGS. 10A-E and 11 show some examples of braze regions 294. For a component 202, for example, braze region 294 may include at least one of: contact interface 346 between coupon opening 204 in body 206 and metal coupon 200 in coupon opening 204, a porous region 300 at least partially in at least one of body 206 and metal coupon 200, and at least one of a portion and an exterior surface 334 of body 206. For a metal coupon 200, for example, braze region 294 may include at least one of: a porous region 300 in AM metal member 290, a contact interface 346 between metal coupon 200 and coupon opening 204 in body 206 of component 202 in which metal coupon 200 is located, and a portion or an exterior surface 334 of body 206 of component 202 in which metal coupon 200 is located. Where braze region 294 includes a porous region 300, the porous region may be the same as infiltrated by braze material 360 or another porous region 300 separate from that which is infiltrated by braze material 360. FIG. 10A shows an example where porous region 300 is the same for both brazing processes. In this example, braze reservoir(s) 292 may be used to provide additional braze material 328 (and perhaps 342) to porous region 300 where braze material 360 may not reach. FIG. 10D shows an embodiment where braze reservoir(s) 292 is used to provide braze material 328 to a porous region 300E different than porous region(s) 300A, 300B used for coupling metal coupon 200 to coupon opening 204. Porous region 300E could be in a location in which, for example, a high stress that results from the predetermined temperature or other causes, is possible. Here, upon the predetermined temperature being reached, first braze material 328 may provide additional strength and/or stability during use of component 202. Any porous region 300 served by braze reservoir(s) 294 may have a variable porosity with two or more porous regions or sub-regions having different porosities, see e.g., FIG. 8D. It will be recognized that porous region 300E as shown in FIG. 10D could alternatively be a solid region in which high stress may cause cracking, which could be filled and stabilized by first braze material 328. FIG. 10B shows an example where braze region 294 is contact interface 346 (joint 384) between metal coupon 200 and coupon opening 204 of body 206 of component 202—first braze material 328 is in joint 384. FIG. 10C shows braze region 294 as a damaged area 348, e.g., a crack, inside a solid area of metal coupon 200. While particular braze regions 294 have been illustrated herein, it is emphasized that braze regions 294 may include other structure and/or features not described herein.

Figure 10E:
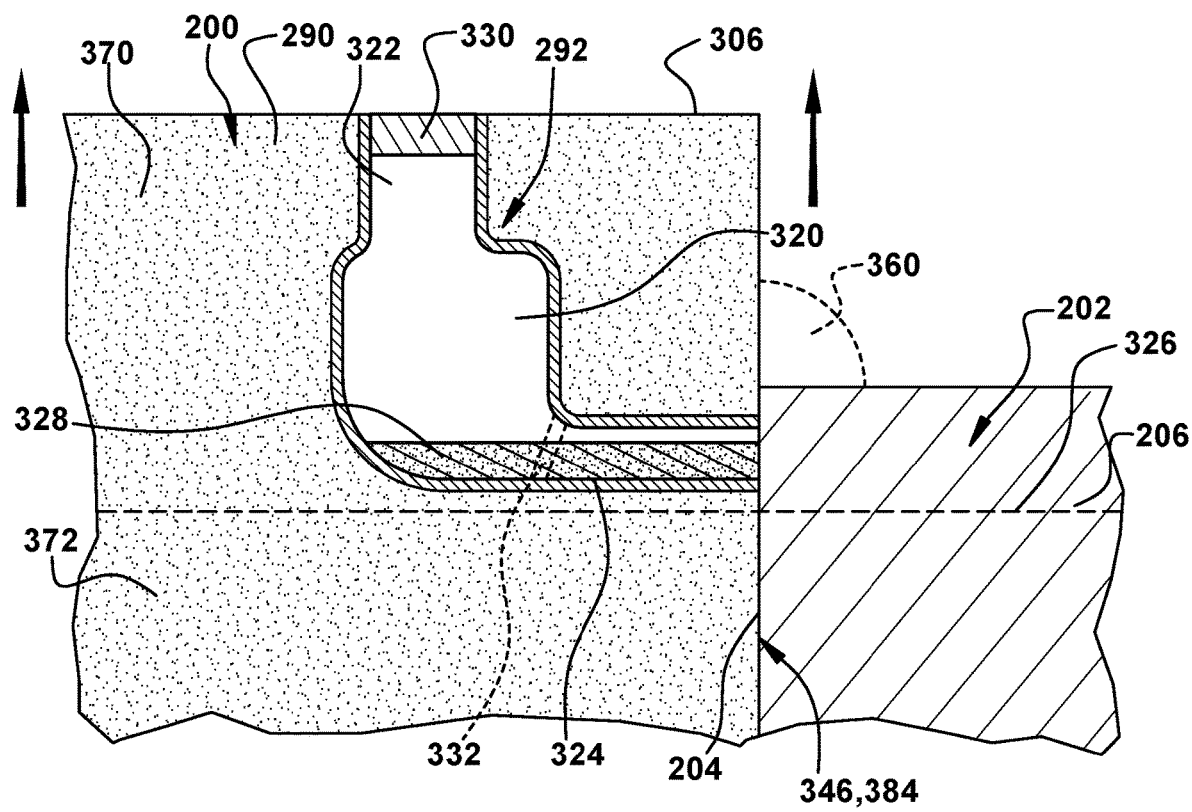

Certain embodiments of the method may include removing braze reservoir 292 from metal coupon 200 or body 206 of component 202 after the heating, i.e., after its use. Referring to FIGS. 8E and 10E, in certain embodiments, braze reservoir 292 may be provided in a removable section 370 of metal coupon 200 or body 206 of component 202. FIGS. 8E and 10E show metal coupon 200 including section 370 of AM metal member 290 of metal coupon 200 that can be later removed once braze reservoir 292 has been used. That is, section 370 is provided for the main purpose of providing braze reservoir 292, but it is not otherwise necessary to component 202 or metal coupon 200. As shown in FIG. 10E, once braze reservoir 292 is used, section 370 of AM metal member 290 in which it is located can be removed, e.g., by grinding, electric discharge machining, etc. In FIG. 10E, section 370 above the dashed horizontal line would be removed. Remaining section 372 of AM metal member 290 may not include any part of braze reservoir 292. A similar approach can be used for component 202, e.g., by forming braze reservoir 292 in a section of component 202 that is not required for the completed component 202 and removing the section after braze reservoir 292 is used.

Other embodiments of a method according to the disclosure may include just forming one or more metal coupons 200 for repairing component 202. In this case, as shown in FIG. 9A, the method includes creating a model of coupon opening 204 in body 206 of component 202, and additively manufacturing metal coupon(s) 200, as described herein.

Any now known or later developed post-manufacture finishing processing may be optionally performed on metal coupon(s) 200, e.g., peening, heat treatment, hot isostatic pressing (HIP), among others. FIG. 9G shows illustrative optional finishing steps for component 202, such as but not limited to machining to make a surface of component 202 seamlessly transition where metal coupon 200 was added. However, as noted, the teachings of the disclosure may remove the need for other finishing steps typically used to address residual stresses present in the material post additive manufacturing, e.g., peening, heat treatment, hot isostatic pressing (HIP), among others.

Embodiments of the disclosure also include a method of using braze reservoir 292 in component 202. Here, the method may include additively manufacturing body 206 of component 202 including braze reservoir 292 therein. FIGS. 3, 4 and 11 show views of an illustrative component 202, e.g., an airfoil as in FIGS. 3-4, including braze reservoir 292. Braze reservoir 292 may include the same structure as described herein relative to metal coupon 200. Namely, braze reservoir 292 may include first cavity 320 in body 206 (not AM metal member 290), second conduit 322 fluidly coupling first cavity 320 to an exterior surface 334 of body 206, and first conduit 324 fluidly coupling first cavity 320 to braze region 294. Braze region 294 may include at least one of: porous region 300 in body 206 (which may optionally include a variable porosity region with two or more porous sub-regions having different porosities), contact interface 346 between body 206 and metal coupon 200 in coupon opening 204 in body 206, at least one of a portion and exterior surface 334 of body 206, and damaged area 348 in body 206. Braze reservoir 292 also includes first braze material 328 in first cavity 320 and seal member 330 sealing second conduit 320 from an exterior of body 206. First braze material 328 is introduced into first cavity 320 through second conduit 322 after additive manufacture of component 202. Once first braze material 328 is in first cavity 320, seal member 330 is formed to seal second conduit 322. Braze reservoir 292 in component 202 may also include blocking member 332 blocking fluid communication through first conduit 324 between first cavity 320 and braze region 294 prior to exposure of blocking member 332 to a predetermined temperature exceeding a melting temperature of first braze material 328. As described herein, blocking member 332 includes a eutectic mixture of a metal material of body 206 and first braze material 328. The predetermined temperature of the heating step, as will be described, exceeds a melting temperature of first braze material 328. The additive manufacturing may also optionally include forming second cavity 340 (FIG. 7D) in body 206 and first conduit 324 between first cavity 320 and braze region 294 and filling second cavity 340 with second braze material 342.

Body 206 of component 202 may be heated to a predetermined temperature exceeding a melting temperature of first braze material 328, causing first braze material 328 to liquefy and blocking member 332 to open and liquefied first braze material 328 (and any remnants of blocking member 332) to flow through first conduit 324 to infiltrate the braze region 294. The heating may occur during manufacture of component 202 to, for example, provide first braze material 328 to porous region 300 to provide a customized physical characteristic(s) at that location, as described herein. In this case, as shown in FIGS. 8E and 10E, braze reservoir 292 may be removed from body 206 after the heating, i.e., after it is used to provide braze material to braze region 294 during manufacture. In other embodiments, heating occurs during use of component 202, e.g., nozzle 126 or blade 132 use in turbomachine 100 (FIG. 1). Here, braze reservoir 292 may be used to address damaged area(s) 348 that arise during use, e.g., potential areas of high stress, oxidation, etc. First braze material 328 infiltrating braze region 294 may prolong the life of component 202. Where second cavity 340 is provided with second braze material 342, when liquefied first braze material 328 flows through first conduit 324, it mixes with at least a portion of second braze material 342, and the mixed liquefied first braze material 328 and second braze material 342 infiltrate braze region 294. As noted above, second braze material 342 may have a higher melting temperature than first braze material 328, requiring a temperature higher than the predetermined temperature to melt it. In such a case, some of second braze material 342 will liquefy, some of second braze material 342 will be entrained with the flow (mixed with liquefied first braze material 328) into braze region 294, and some of second braze material 342 will be left behind.

FIGS. 3, 4, 10A-E and 11 show embodiments of an additively manufactured (AM) component 202 including a used braze reservoir 292 according to embodiments of the disclosure. In this case, component 202 includes solidified first braze material 328 in braze region 294, whatever form braze region 294 takes. FIGS. 10A-E and 11 show liquefied first braze material 328 flowing through first conduit 324 (or solidified partly in first conduit 324). Some of first braze material 328 may also remain in first cavity 322, i.e., after it solidifies. However, in response to metal coupon 200 or body 206 exceeding the predetermined temperature, first cavity 320 is at least partially open space, i.e., in metal coupon 200 in coupon opening 204 of body 206 or in body 206.

Referring to FIGS. 10A-E, component 202 includes body 206. As noted herein, body 206 can have any form for the particular industrial application in which component 202 is used. In the examples used herein, body 206 is for a turbine rotating blade 132 (FIG. 3) or a turbine stationary nozzle 126 (FIG. 4). While metal coupon 200 is shown in an airfoil 150, 176 of blade 132 and nozzle 126 in FIGS. 3 and 4, respectively, metal coupon 200 can be in any part of body 206 of component 202. Component 202 also includes additively manufactured (AM) metal coupon 200 having used braze reservoir 292. Braze material(s) 360 couple metal coupon 200 in coupon opening 204 in body 206 and may infiltrate a porous region 300.

As shown in FIG. 10A, braze material 360 includes a first section 390 infiltrated into porous region 300 based at least on a characteristic of the first porosity thereof. As shown in FIG. 10B, braze material 360 includes first section 390 infiltrated into first porous region 300A, and metal coupon 200 further includes second (inner) porous region 300B having a second porosity different than the first porosity. The first porosity may be different from the second porosity in terms of at least one of the following characteristics: percentage of open space volume to total volume, pore shape, pore size, number of pores, and pore connectivity. "At least on a characteristic" of the porosity indicates the porosity can result in different infiltration characteristics, such as brazing material volume, pattern within the porosity, crystallization, chemistry gradients and composition, among other characteristics. However, as understood in the art, other factors can also impact the infiltration characteristics such as the type of braze material and characteristics of the brazing process such as but not limited to: temperature, pressure, positioning of component 202 and the format and arrangement of metal coupon 200. Body 206 may have a third porosity different than both first porosity and second porosity. For example, body 206 may have a third porosity denser than both first porosity and second porosity, e.g., it can be 100% solid. Optionally, metal coupon 200 may include a variable porosity region 312 with two or more porous sub-regions (sub-regions only shown by dashed boxes in FIG. 10B for clarity) between (and possibly including part of) first, outer porous region 300A and second, inner porous region 300B. The variable porosity region 312 may gradually change porosity between first and second porosities, e.g., in a stepped or incremental manner. For example, as shown for example in FIG. 8D, a porosity of porous region 300 may increase in defined steps (via porous sub-regions) from an inner region towards exterior surface 306 of metal coupon 200. As described herein, in certain cases, a porosity of the porous region 300 may increase towards exterior surface 306 of metal coupon 200, e.g., so more braze material 360 is in a more outer porous region, e.g., 300A of metal coupon 200 in component 202.

In FIG. 10B, braze material 360B includes a second section 392 infiltrated into second porous region 300B based at least on a characteristic of the second porosity. The consequence of the different porosities is that first porous region 300A and second porous region 300B with braze material(s) 360 therein have at least one different physical characteristic. The porosities can be customized to select those physical characteristics inasmuch as the porosities can impact those physical characteristics. In one example, the first porosity of first porous region 300A may be higher (i.e., less dense) than the second porosity of second porous region 300B and first, porous region 300A includes more braze material 360 (328, 342) therein than second porous region 300B. As shown in FIG. 10B, first porous region 300A may be adjacent exterior surface 306 of metal coupon 200 that has a higher porosity than second (inner) porous region 300B, and porous region 300A includes more braze material therein than porous region 300B. In another example, shown in FIG. 10B, first porous region 300A is in at least part of an edge 308 of metal coupon 200 configured for joining to body 206. This arrangement, as shown in FIG. 10B, may be advantageous to place more braze material 360 (328, 342) near a braze joint 384 to strengthen the joint adhesive bond strength of metal coupon 200 in coupon opening 204 in body 206, or it may allow for less oxidation at braze joint 384 or greater thermal conductivity at braze joint 384. Any of the physical characteristics described herein can also be customized based on the different porosities and/or different braze materials. As noted, depending on the braze material 360 (328, 342) used, the different porosities may allow for customization of physical characteristic(s) of component 202, such as: joint adhesive bond strength, stress/strain resistance, ductility, wear resistance, oxidation resistance, thermal conductivity, electrical conductivity, surface roughness, hardness, and/or mass. As noted, metal coupon 200 may have a near net shape of coupon opening 204 in body 206 of component 202.

While particular locations of different porous regions 300 and/or sub-regions have been illustrated herein, it is emphasized that the different porous regions or sub-regions can be arranged in any manner to provide different braze material infiltration characteristics and different physical characteristics of component 202.

Embodiments of the disclosure may also include, as shown in FIGS. 1-2, turbomachine 100 including turbine assembly 110, and at least one component 202, as described herein. Component(s) 202 may take the form turbine stationary nozzle(s) 126, turbine rotating blade(s) 132 or other components of turbomachine 100. Metal coupon 200 can be used in a newly manufactured component or in a repaired component.

The disclosure provides various technical and commercial advantages, examples of which are discussed herein. For repairs, additive manufacturing allows cost-effective creation of metal coupons with custom-fitted shapes where only damaged material needs to be removed. Porous regions or sub-regions may provide a higher percentage of a base metal alloy (e.g., >60%) in certain areas that may result in improved physical characteristics compared to, e.g., pre-sintered preforms. Porous region or sub-regions may also provide a welded/fused particle matrix (e.g., with a superalloy metal base) with braze material fill which is stronger compared to conventional metal particles surrounded by braze material. Multi-flow paths of the braze material using multiple porous regions or sub-regions may also decrease the likelihood of a lack of fill and/or voids along a brazed joint compared to the conventional narrow gap-filling brazing process. Porous regions or sub-regions can be formed with varying porosity/density across metal coupon to allow for highly customized braze material flow. Porous regions or sub-regions also accommodate greater joint gap dimensional variance compared to machined solid coupons with narrow gaps for braze material. The braze reservoir additionally provides liquefied braze material to difficult areas to reach, and the ability to provide motive force into a variety of braze regions, e.g., porous regions, cracks, and interfaces between coupon and component body. The pressurized liquefied braze material from the braze reservoir may infiltrate a variety of braze regions that may not normally receive liquefied braze material entering through gravity forces and/or capillary action. When used in a body of a component, the braze reservoir may also provide self-healing, e.g., for internal cracks, during use of the component or during heat treatment without additional processing.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A metal coupon for inserting in a component, the metal coupon comprising:
   an additively manufactured (AM) metal member including a braze reservoir, the braze reservoir including:
      a first cavity in the AM metal member;
      a first conduit fluidly coupling the first cavity to a braze region; and
      a blocking member blocking fluid communication through the first conduit between the first cavity and the braze region;
   a first braze material in the first cavity; and
   a seal member sealing the first cavity from an exterior of the AM metal member.

2. The metal coupon of claim 1, wherein the blocking member includes a eutectic mixture of a metal material of the AM metal member and at least one element of the first braze material.

3. The metal coupon of claim 1, further comprising a second cavity defined in the AM metal member and by an enlarged area of the first conduit between the first cavity and the braze region, the second cavity having a second braze material therein that is different than the first braze material.

4. The metal coupon of claim 3, wherein the second braze material has a higher melting temperature than the first braze material.

5. The metal coupon of claim 1, wherein the braze region includes at least one of: a porous region within the AM metal member, a contact interface between the AM metal member and a coupon opening in a body of the component in which the AM metal member is located, and a portion of the body of the component in which the AM metal member is located.

6. The metal coupon of claim 5, wherein the porous region has a variable porosity with two or more porous sub-regions having different porosities.

7. The metal coupon of claim 1, wherein the braze reservoir is removable from the AM metal member, leaving a remaining section of the AM metal member.

8. A metal coupon for inserting in a component, the metal coupon comprising:
   an additively manufactured (AM) metal member including a braze reservoir, the braze reservoir including:
      a first cavity in the AM metal member;
      a first conduit fluidly coupling the first cavity to a braze region; and
      a blocking member blocking fluid communication through the first conduit between the first cavity and the braze region;
   a first braze material in the first cavity;
   a seal member sealing the first cavity from an exterior of the AM metal member; and
   a second conduit fluidly coupling the first cavity to an exterior surface of the AM metal member, wherein the seal member seals the second conduit from the exterior surface of the AM metal member.

9. An additively manufactured (AM) component, comprising:
   a body including a braze reservoir, the braze reservoir including:
      a first cavity defined in the body;
      a first braze material in the first cavity;
      a seal member sealing the first cavity from an exterior of the body;
      a first conduit defined in the body and fluidly coupling the first cavity to a braze region;
   a second conduit fluidly coupling the first cavity to the exterior surface of the body, wherein the seal member seals the second conduit from the exterior surface of the body; and
   a blocking member extending across the first conduit to block fluid communication between the first cavity and the braze region prior to exposure of the blocking member to a predetermined temperature exceeding a melting temperature of the first braze material.

10. The AM component of claim 9, wherein the blocking member includes a eutectic mixture of a metal material of the body and the first braze material, wherein the predetermined temperature exceeds a melting temperature of first braze material.

11. The AM component of claim 10, wherein in response to the body exceeding the predetermined temperature, the first braze material and the blocking member liquefy, causing the liquefied first braze material to flow through the first conduit to infiltrate the braze region.

12. The AM component of claim 11, further comprising a second cavity defined in the body and the first conduit between the first cavity and the braze region, the second cavity having a second braze material therein that is different than the first braze material, wherein the liquefied first braze material flows through the first conduit and mixes with at least a portion of the second braze material, wherein the mixed liquefied first braze material and second braze material infiltrate the braze region.

13. The AM component of claim 12, wherein the second braze material has a higher melting temperature than the first braze material.

14. The AM component of claim 9, wherein the braze region includes at least one of:
   a contact interface between a coupon opening in the body and a metal coupon in the coupon opening, a porous region at least partially in at least one of the body and the metal coupon, and at least one of a portion and an exterior surface of the body.

15. The AM component of claim 14, wherein the porous region has a variable porosity with two or more porous sub-regions having different porosities.

16. The AM component of claim 9, wherein the braze reservoir is removable from the body, leaving a remaining section of the body and the braze region.

17. An additively manufactured (AM) component, comprising:
   a body including a braze reservoir, the braze reservoir including:
      a first cavity defined in the body;
      a first braze material in the first cavity;
      a seal member sealing the first cavity from an exterior of the body;
      a first conduit defined in the body and fluidly coupling the first cavity to a braze region; and
      a blocking member extending across the first conduit to block fluid communication between the first cavity and the braze region prior to exposure of the blocking member to a predetermined temperature exceeding a melting temperature of the first braze material, wherein in response to the body exceeding the predetermined temperature, the first cavity is an at least partially open space.

* * * * *